(12) United States Patent
Shakarian et al.

(10) Patent No.: US 12,235,969 B2
(45) Date of Patent: Feb. 25, 2025

(54) SYSTEM AND METHOD FOR CALCULATING AND UNDERSTANDING AGGREGATION RISK AND SYSTEMIC RISK ACROSS A POPULATION OF ORGANIZATIONS WITH RESPECT TO CYBERSECURITY FOR PURPOSES OF DAMAGE COVERAGE, CONSEQUENCE MANAGEMENT, AND DISASTER AVOIDANCE

(71) Applicant: Securin Inc., Albuquerque, NM (US)

(72) Inventors: Paulo Shakarian, Tempe, AZ (US); Jana Shakarian, Tempe, AZ (US); Gerardo I. Simari, Tempe, AZ (US); Harshdeep Singh Sandhu, Tempe, AZ (US); Anudeep Reddy Sanepalli, Tempe, AZ (US)

(73) Assignee: SECURIN INC., Albuquerque, NM (US)

( * ) Notice: Subject to any disclaimer, the term of this patent is extended or adjusted under 35 U.S.C. 154(b) by 293 days.

(21) Appl. No.: 17/611,415

(22) PCT Filed: May 20, 2020

(86) PCT No.: PCT/US2020/033846
§ 371 (c)(1),
(2) Date: Nov. 15, 2021

(87) PCT Pub. No.: WO2020/236960
PCT Pub. Date: Nov. 26, 2020

(65) Prior Publication Data
US 2022/0215102 A1    Jul. 7, 2022

Related U.S. Application Data

(60) Provisional application No. 62/850,431, filed on May 20, 2019.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .................. G06F 21/577; G06F 2221/034
See application file for complete search history.

(56) References Cited

U.S. PATENT DOCUMENTS

| | | | |
|---|---|---|---|
| 8,020,210 | B2 | 9/2011 | Tippett et al. |
| 8,544,098 | B2 | 9/2013 | Gustave et al. |

(Continued)

FOREIGN PATENT DOCUMENTS

| | | | |
|---|---|---|---|
| EP | 3282668 | A1 | 2/2018 |
| EP | 3471045 | A1 | 4/2019 |

(Continued)

OTHER PUBLICATIONS

Oliver Koo; Subset Sum algorithm; Aug. 1, 2017; retrieved from: https://stackoverflow.com/questions/4355955/subset-sum-algorithm on Apr. 11, 2024 (Year: 2017).*

(Continued)

*Primary Examiner* — James R Turchen
(74) *Attorney, Agent, or Firm* — Justin R. Jackson; Daniel Berenger-Russell; Peacock Law P.C

(57) ABSTRACT

Embodiments of a computer-implemented system and methods for predicting and/or determining a probability of a cyber-related attack and associated costs are disclosed.

12 Claims, 11 Drawing Sheets

(56) References Cited

U.S. PATENT DOCUMENTS

| | | | |
|---|---|---|---|
| 8,955,127 B1 | 2/2015 | Sokolov et al. | |
| 8,966,639 B1* | 2/2015 | Roytman | H04L 63/1433 726/25 |
| 9,185,119 B1 | 11/2015 | Tamersoy et al. | |
| 9,195,826 B1 | 11/2015 | Fang et al. | |
| 9,292,885 B2 | 3/2016 | Astore | |
| 9,294,498 B1 | 3/2016 | Yampolskiy et al. | |
| 9,411,965 B2 | 8/2016 | Giakouminakis et al. | |
| 9,692,778 B1 | 6/2017 | Mohanty | |
| 9,928,369 B2 | 3/2018 | Grieco et al. | |
| 10,015,175 B2 | 7/2018 | Kent et al. | |
| 10,078,750 B1 | 9/2018 | Oliver | |
| 10,114,954 B1 | 10/2018 | Bellis et al. | |
| 10,176,438 B2 | 1/2019 | Shakarian et al. | |
| 10,217,071 B2 | 2/2019 | Mo et al. | |
| 10,230,764 B2 | 3/2019 | Ng et al. | |
| 10,397,272 B1 | 8/2019 | Bruss et al. | |
| 10,754,959 B1 | 8/2020 | Rajasooriya et al. | |
| 10,944,778 B1 | 3/2021 | Golan et al. | |
| 11,062,022 B1 | 7/2021 | Kalamkar et al. | |
| 11,126,679 B2 | 9/2021 | Shaabani et al. | |
| 11,159,556 B2* | 10/2021 | Gerber, Jr. | G06N 20/20 |
| 11,444,974 B1* | 9/2022 | Shakhzadyan | H04L 63/1466 |
| 11,677,773 B2* | 6/2023 | Iyer | G06F 21/577 726/25 |
| 11,736,527 B1 | 8/2023 | Joseph Durairaj et al. | |
| 2005/0278786 A1* | 12/2005 | Tippett | H04L 63/1416 726/25 |
| 2006/0156407 A1* | 7/2006 | Cummins | G06F 21/55 726/25 |
| 2007/0250829 A1 | 10/2007 | Hillier et al. | |
| 2010/0275263 A1* | 10/2010 | Bennett | G06F 21/577 345/589 |
| 2012/0210434 A1 | 8/2012 | Curtis et al. | |
| 2013/0074188 A1* | 3/2013 | Giakouminakis | G06F 21/577 726/25 |
| 2013/0097706 A1 | 4/2013 | Titonis et al. | |
| 2013/0227695 A1 | 8/2013 | Shankar | |
| 2014/0137257 A1 | 5/2014 | Martinez et al. | |
| 2014/0189873 A1* | 7/2014 | Elder | H04L 63/1433 726/25 |
| 2014/0280610 A1 | 9/2014 | Chen et al. | |
| 2014/0283080 A1 | 9/2014 | Beskrovny et al. | |
| 2014/0304343 A1 | 10/2014 | Skiba et al. | |
| 2014/0337974 A1 | 11/2014 | Joshi et al. | |
| 2015/0163242 A1 | 6/2015 | Laidlaw et al. | |
| 2015/0295948 A1* | 10/2015 | Hassell | H04L 63/1441 726/25 |
| 2015/0332054 A1 | 11/2015 | Eck et al. | |
| 2015/0381649 A1 | 12/2015 | Schultz et al. | |
| 2016/0119364 A1 | 4/2016 | Zolli | |
| 2016/0188396 A1 | 6/2016 | Sonalker et al. | |
| 2016/0188876 A1 | 6/2016 | Harris et al. | |
| 2016/0197953 A1* | 7/2016 | King-Wilson | G06Q 40/08 726/25 |
| 2016/0248800 A1 | 8/2016 | Ng et al. | |
| 2016/0371490 A1 | 12/2016 | Shakarian et al. | |
| 2016/0381075 A1 | 12/2016 | Goyal et al. | |
| 2017/0026391 A1 | 1/2017 | Abu-Nimeh | |
| 2017/0032130 A1 | 2/2017 | Joseph Durairaj et al. | |
| 2017/0034023 A1 | 2/2017 | Nickolov et al. | |
| 2017/0063909 A1 | 3/2017 | Muddu et al. | |
| 2017/0085595 A1 | 3/2017 | Ng et al. | |
| 2017/0093904 A1 | 3/2017 | Ng et al. | |
| 2017/0208084 A1 | 7/2017 | Steelman et al. | |
| 2017/0214710 A1 | 7/2017 | Seiver et al. | |
| 2017/0228537 A1 | 8/2017 | Mont et al. | |
| 2017/0279843 A1 | 9/2017 | Schultz et al. | |
| 2017/0288671 A1 | 10/2017 | Lewis et al. | |
| 2017/0346846 A1 | 11/2017 | Findlay | |
| 2017/0366572 A1 | 12/2017 | King-Wilson | |
| 2018/0063170 A1 | 3/2018 | Truvé et al. | |
| 2018/0077251 A1 | 3/2018 | Shalita et al. | |
| 2018/0103054 A1 | 4/2018 | Cran et al. | |
| 2018/0144123 A1 | 5/2018 | Levin et al. | |
| 2018/0146004 A1 | 5/2018 | Belfiore et al. | |
| 2018/0150635 A1 | 5/2018 | Melvin et al. | |
| 2018/0165597 A1 | 6/2018 | Jordan et al. | |
| 2018/0197089 A1 | 7/2018 | Krasser et al. | |
| 2018/0198816 A1 | 7/2018 | Ahmed et al. | |
| 2018/0225372 A1 | 8/2018 | Lecue et al. | |
| 2018/0268304 A1 | 9/2018 | Manadhata et al. | |
| 2018/0270261 A1 | 9/2018 | Pande et al. | |
| 2018/0288086 A1 | 10/2018 | Amiri et al. | |
| 2018/0309747 A1 | 10/2018 | Sweet et al. | |
| 2018/0343276 A1 | 11/2018 | Lisle et al. | |
| 2018/0375896 A1 | 12/2018 | Wang et al. | |
| 2019/0020669 A1 | 1/2019 | Glatfelter et al. | |
| 2019/0028490 A1 | 1/2019 | Chen et al. | |
| 2019/0052665 A1* | 2/2019 | Mahieu | G06N 5/01 |
| 2019/0095530 A1 | 3/2019 | Booker et al. | |
| 2019/0102286 A1 | 4/2019 | Duer et al. | |
| 2019/0114417 A1 | 4/2019 | Subbarayan et al. | |
| 2019/0124109 A1 | 4/2019 | Foster et al. | |
| 2019/0132352 A1 | 5/2019 | Zhang et al. | |
| 2019/0138731 A1 | 5/2019 | Tan et al. | |
| 2019/0138733 A1 | 5/2019 | Ionescu et al. | |
| 2019/0147167 A1 | 5/2019 | Kim et al. | |
| 2019/0183403 A1 | 6/2019 | Gand | |
| 2019/0190931 A1 | 6/2019 | Levin et al. | |
| 2019/0222602 A1 | 7/2019 | Linder | |
| 2019/0230129 A1 | 7/2019 | Digiambattista et al. | |
| 2019/0294802 A1 | 9/2019 | Eacmen et al. | |
| 2019/0318424 A1 | 10/2019 | McWilliams et al. | |
| 2019/0347428 A1 | 11/2019 | Youssefi et al. | |
| 2019/0349351 A1 | 11/2019 | Verma et al. | |
| 2019/0377871 A1 | 12/2019 | Park et al. | |
| 2019/0379692 A1 | 12/2019 | Garcia Duran et al. | |
| 2019/0379700 A1 | 12/2019 | Canzanese et al. | |
| 2020/0012796 A1* | 1/2020 | Trepagnier | G06F 18/254 |
| 2020/0036743 A1 | 1/2020 | Almukaynizi et al. | |
| 2020/0053121 A1 | 2/2020 | Wilcox | |
| 2020/0057857 A1 | 2/2020 | Roytman et al. | |
| 2020/0067953 A1 | 2/2020 | Mathew | |
| 2020/0074078 A1 | 3/2020 | Saxe et al. | |
| 2020/0076832 A1 | 3/2020 | Jusko et al. | |
| 2020/0082094 A1 | 3/2020 | McAllister et al. | |
| 2020/0097662 A1 | 3/2020 | Hufsmith et al. | |
| 2020/0106792 A1 | 4/2020 | Louie et al. | |
| 2020/0169483 A1 | 5/2020 | Kursun | |
| 2020/0204576 A1 | 6/2020 | Davis et al. | |
| 2020/0210590 A1 | 7/2020 | Doyle et al. | |
| 2020/0233961 A1 | 7/2020 | Wolfin et al. | |
| 2020/0252422 A1 | 8/2020 | Davis et al. | |
| 2020/0285752 A1 | 9/2020 | Wyatt et al. | |
| 2020/0327237 A1 | 10/2020 | Shakarian et al. | |
| 2020/0356675 A1 | 11/2020 | Shakarian et al. | |
| 2020/0364349 A1 | 11/2020 | Nunes et al. | |
| 2020/0410028 A1 | 12/2020 | Shaabani et al. | |
| 2021/0019235 A1 | 1/2021 | Savir et al. | |
| 2021/0019762 A1 | 1/2021 | Bosnjakovic et al. | |
| 2021/0029164 A1 | 1/2021 | Albero et al. | |
| 2021/0075814 A1 | 3/2021 | Bulut et al. | |
| 2021/0126949 A1 | 4/2021 | Nadgowda et al. | |
| 2021/0158176 A1 | 5/2021 | Wan et al. | |
| 2021/0173935 A1 | 6/2021 | Ramasamy et al. | |
| 2021/0185066 A1 | 6/2021 | Shah et al. | |
| 2021/0209512 A1 | 7/2021 | Gaddam et al. | |
| 2021/0234892 A1 | 7/2021 | Narayanaswamy | |
| 2021/0310237 A1 | 10/2021 | Marlow | |
| 2021/0367966 A1 | 11/2021 | Yanay et al. | |
| 2021/0382944 A1 | 12/2021 | Li et al. | |
| 2022/0070196 A1 | 3/2022 | Sarkar et al. | |
| 2022/0103575 A1 | 3/2022 | Fokker | |
| 2022/0121741 A1 | 4/2022 | Araujo et al. | |
| 2022/0129540 A1 | 4/2022 | Sheriff et al. | |
| 2022/0131889 A1 | 4/2022 | Scheideler et al. | |
| 2024/0176890 A1 | 5/2024 | Nunes et al. | |

FOREIGN PATENT DOCUMENTS

| | | |
|---|---|---|
| EP | 3487144 A1 | 5/2019 |
| GB | 2583892 A | 11/2020 |

(56) References Cited

FOREIGN PATENT DOCUMENTS

| WO | 2014152469 | | 4/2014 |
|---|---|---|---|
| WO | 2015200046 | A1 | 12/2015 |
| WO | 2017078986 | | 5/2017 |
| WO | 2017137804 | A1 | 8/2017 |
| WO | 2019089389 | A1 | 5/2019 |

OTHER PUBLICATIONS

International Search Report and Written Opinion issued in corresponding Application No. PCT/US2020/033846, Aug. 6, 2020, 13 pages.
Roy et al., Scalable Optimal Countermeasure Selection Using Implicit Enumeration on Attack Countermeasure Trees, IEEE/IFIP International Conference on Dependable Systems and Networks (DSN), 2012, pp. 1-12 [online], [retrieved on Jul. 13, 2020]. Retrieved from the internet <url:https://www.computer.org/csdl/pds/api/csdl/proceedings/download-article/12OmNyvY9Aa/pdf> pp. 1-10, especially 1-9, Fig. 1, 8, 9.
"Adobe adding 'priority ratings' to security alerts", Adobe, 2012. Adding priority ratings to adobe security bulletins., Mar. 6, 2012.
"Cisco 2016 Midyear Security Report", Last Accessed: Jan. 16, 2024. https://www.cisco.com/c/dam/m/en_ca/never-better/assets/files/midyear-security-report-2016.pdf., Jul. 1, 2016.
"CiscoTalos", Last Accessed: Jan. 16, 2024. https://www.talosintelligence.com/vulnerability_reports.
"Common vulnerabilities and exposures: The standard for information security vulnerability names", CVE, 2016, http://cve.mitre.org/, Last Accessed: Jan. 2024.
"Common vulnerability scoring system", CVSS, https://www.first.org/cvss, Last Accessed: Jan. 2024.
"Contagio", Last Accessed: Jan. 16, 2024. http://contagiodump.blogspot.com/.
"CVE Numbering Authorities", Mitre, Last Accessed: Jan. 16, 2024, https://www.cve.org/ProgramOrganization/CNAs.
"Cyber-attack Automated Unconventional Sensor Environment (Cause).", IARPA, Last Accessed: Jan. 16, 2024. https://www.iarpa.gov/index.php/research-programs/cause. (Last Accessed: Jan. 16, 2024).
"Exploit Database", Offensive Security. Last Accessed: Jan. 16, 2024. https://www.exploit-db.com/.
"Exploitability index", Microsoft 2008, Last accessed Jan. 18, 2024; https://www.microsoft.com/en-us/msrc/exploitability-index.
"Metasploit", Last Accessed: Jan. 16, 2024. https://www.metasploit.com/.
"National Vulnerability Database", N. 2013, Nvd. https://nvd.nist.gov/vuln/detail/CVE-2013-0285., 2013.
"Official Common Platform Enumeration (CPE) Dictionary", CPE, 2017. https://nvd.nist.gov/cpe.cfm, Last Accessed: Jan. 2024.
"Official Common Platform Enumeration Dictionary", NVD, Products>CPE. Last Accessed: Jan. 16, 2024, https://https://nvd.nist.gov/products/cpe.
"Symantec Attack signatures", Last Accessed: Jan. 2024. https://https://www.broadcom.com/support/security-center/attacksignatures?
"Tipping Point", Last Accessed: Jan. 16, 2024, the Zero Day Initiative, http://www.zerodayinitiative.com/.
"Virustotal", Last Accessed: Jan. 16, 2024, https://www.virustotal.com/.
"Vulnerability Exploit database", Rapid7, rapid7.com/db/ Last accessed Jan. 17, 2024.
"WannaCry ransomware attack", Wikipedia, Last Accessed: Jan. 16, 2024, https://en.wikipedia.org/wiki/WannaCry_ransomware_attack.
Abbasi, Ahmed, et al., "Descriptive Analytics: Examining Expert Hackers in Web Forums", 2014 IEEE Joint Intelligence and Security Informatics Conference (JISIC)., Sep. 2014, 56-63.
Ai-Rowaily, Khalid, et al., "BiSALA bilingual sentiment analysis lexicon to analyze Dark Web forums for cyber security", Digital Investigation, vol. 14, Elsevier., 2015, 53-62.

Akoglu, Leman, "Graph-based Anomaly Detection and Description: A Survey", Data mining and knowledge discovery, 29(3)., Jan. 28, 2014, 626-688.
Allodi, Luca, et al., "A Preliminary Analysis of Vulnerability Scores for Attacks in Wild: The EKITS and SYM Datasets", Proceedings of the 2012 ACM Workshop on Building analysis datasets and gathering experience returns for security, ACM., Oct. 15, 2012, 17-24.
Allodi, Luca, et al., "Comparing Vulnerability Severity and Exploits Using Case-Control Studies", ACM Transactions on Information and System Security, vol. 17, Issue 1, Article No. 1, https://doi.org/10.1145/2630069., Aug. 15, 2014, 1-20.
Allodi, Luca, "Economic Factors of Vulnerability Trade and Exploitation", Proceedings of the 2017 ACM SIGSAC Conference on Computer and Communications Security, ACM, https://doi.org/10.1145/3133956.3133960., Oct. 2017, 1483-1499.
Allodi, Luca, et al., "Quantitative assessment of risk reduction with cybercrime black market monitoring", Security and Privacy Workshops (SPW), IEEE, DOI:10.1109/SPW.2013.16., May 23, 2013, 165-172.
Allodi, Luca, et al., "The Work-Averse Cyber Attacker Model: Theory and Evidence From Two Million Attack Signatures", Risk Analysis 42(1)., Jun. 27, 2017.
Allodi, Luca, et al., "Then and now: On the maturity of the cybercrime markets the lesson that black-hat marketeers learned", IEEE Transactions on Emerging Topics in Computing 4(1), 35-46., Mar. 2016, 35-46.
Almukaynizi, Mohammed, et al., "Proactive identification of exploits in the wild through vulnerability mentions online", 2017 International Conference on Cyber Conflict (CYCON U.S.), I@@@, Nov. 7, 2017, 82-88.
Barrena, Marco, et al., "The security of machine learning", Machine Learning 81(2), DOI:10.1007/s10994-010-5188-5., Nov. 2010, 121-148.
Barreno, Marco, et al., "Open problems in the security of learning", Proceedings of the 1st ACM Workshop on Security and Artificial Intelligence, AlSec 2008, Alexandria, VA, USA, ACM,DOI:10.1145/1456377.1456382., Oct. 27, 2008, 19-26.
Bengio, Yoshua, et al., "A Neural Probabilistic Language Model", Journal of Machine Learning Research 3., Oct. 2001, 1137-1155.
Benjamin, Victor, et al., "Exploring threats and vulnerabilities in hacker web: Forums, IRC and carding shops", 2015 IEEE International Conference on Intelligence and Security Informatics (ISI), IEEE International Conference, IEEE., 2015, 85-90.
Beutel, Alex, et al., "Fraud Detection through Graph-Based User Behavior Modeling", Proceedings of the 22nd ACM SIGSAC Conference on Computer and Communications Security, ACM, DOI:10.1145/2810103.2812702., Oct. 2015, 1696-169.
Biggio, Battista, et al., "Support Vector Machines Under Adversarial Label Noise", Asian Conference on Machine Learning, JMLR: Workshop and Conference Proceedings 20, 2011, 97-112.
Bilge, Leyla, et al., "Before we knew it: An empirical study of zero-day attacks in the real world", Proceedings of the 2012 ACM conference on computer and communications security, ACM., Oct. 2012, 833-844.
Bilge, Leyla, et al., "RiskTeller: Predicting the Risk of Cyber Incidents", Session F2: Insights from Log(in)s, Proceedings of the 2017 ACM SIGSAC Conference on Computer and Communications Security., ACM, https://doi.org/10.1145/3133956.3134022., 2017, 1299-1311.
Bommannavar, Praveen, et al., "Security Risk Management in Computing Systems with Constraints on Service Disruption", 2011 Proceedings of 20th International Conference on Computer Communications and Networks (ICCCN), Lahaina, HI, USA, doi: 10.1109/ICCCN.2011.6005875., 2011, 1-6.
Bozorgi, Mehran, et al., "Beyond Heuristics: Learning to Classify Vulnerabilities and Predict Exploits", Proceedings of the Sixteenth ACM Conference on Knowledge Discovery and Data Mining (KDD-2010), Washington, DC, USA, DOI:10.1145/1835804.1835821., 2010, 105-114.
Brady, Kelly, et al., "Docker Container Security in Cloud Computing", Conference: 2020 10th Annual Computing and Commu-

(56) References Cited

OTHER PUBLICATIONS nication Workshop and Conference (CCWC), Las Vegas, NV, USA, DOI:10.1109/CCWC47524.2020.9031195, 2020, 0975-0980.

Breiman, Leo, "Bagging Preditors, Machine Learning", Breiman, Bagging Preditors, Machine Learning, vol. 24, https://doi.org/10.1007/BF00058655., Aug. 1996, 123-140.

Breiman, Leo, "Random Forests", , Machine Learning, vol. 45, https://doi.org/10.1023/A:1010933404324., Oct. 2001, 5-32.

Bullough, Benjamin L., et al., "Predicting Exploitation of Disclosed Software Vulnerabilities Using Open-source Data", In Proceedings of the 3rd ACM on International Workshop on Security and Privacy Analytics (IWSPA 2017). ACM, New York, NY, USA., 2017, 45-53.

Cao, Qiang, et al., "Aiding the Detection of Fake Accounts in Large Scale Social Online Services", Proceedings of the 9th USENIX conference on Networked Systems and Design and Implementation (NSDI 12), USENIX Association., Apr. 2012, 1-14.

Cao, Qiang, et al., "Uncovering Large Groups of Active Malicious Accounts in Online Social Networks", Proceedings of the 2014 ACM SIGSAC Conference on Computer and Communications Security, ACM., Nov. 3, 2014, 477-488.

Chandola, Varun, et al., "Anomaly Detection: A Survey", (CSUR) 41.3: 15, DOI:10.1145/1541880.1541882., 2009, 1-72.

Chawla, Nitesh V., et al., "SMOTE: Synthetic Minority Oversampling Technique", Journal of Artificial Intelligence Research 16, http://dl.acm.org/citation.cfm?id=1622407.1622416., Jun. 1, 2002, 321-357.

Chen, Hsinchun, "Sentiment and affect analysis of Dark Web forums: Measuring radicalization on the internet", 2008 IEEE International Conference on Intelligence and Security Informatics, Taipei, Taiwan, doi: 10.1109/ISI.2008.4565038., Jun. 17, 2008, 104-109.

Chierichetti, Flavio, et al., "Rumour Spreading and Graph Conductance", Proceedings of the twenty-first annual ACM-SIAM symposium on Discrete Algorithms, Society for Industrial and Applied Mathematics, Austin, Texas, USA, DOI:10.1137/1.9781611973075.135, Jan. 17, 2010.

Colbaugh, Kristin, et al., "Proactive Defense for Evolving Cyber Threats", Intelligence and Security Informatics (ISI), IEEE International Conference on IEEE., 2011, 1-6.

Portnoff, et al., "Tools for Automated Analysis of Cybercriminal Markets", In Proceedings of the 26th International Conference on World Wide Web, International World Wide Web Conferences Steering Committee., 2017, 657-666.

Quinlan, J.R., et al., "Induction of Decision Trees", Machine Learning (1), 1986 Kluwer Academic Publishers, Boston—Manufactured in the Netherlands, http://dx.doi.org/10.1007/BF00116251., 1986, 81-106.

Quinn, Stephen, et al., "Guide to Adopting and Using the Security Content Automation Protocol (SCAP) Version 1.0", NIST Special Publication (NIST SP)—800-117, Technical Report, U.S. Dept of Commerce., Jul. 2010, 27 pages.

Randall, Dana, "Rapidly mixing Markov chains with applications in computer science and physics", Computing in Science & Engineering 8(2), IEEE Xplore, DOI:10.1109/MCSE.2006.30., Apr. 2006, 30-41.

Reksna, Toms, "Complex Network Analysis of Darknet Black Market Forum Structure", MS thesis., 2017, 1-48.

Robertson, J., et al., "Darkweb CyberThreat Intelligence Mining", Cambridge University Press, 2017.

Roldan-Molina, Gabriela Del Rocio, "A Decision Support System for Corporation Cyber Security Risk Management", 2017 12th Iberian Conference on Information Systems and Technologies (CISTI)., Jun. 24, 2017, 1-6.

Rumelhart, David E., et al., "Learning representations by back-propagating errors", Nature, vol. 323, Issue 6088, Neurocomputing: Foundations of Research., Oct. 9, 1986, 533-536.

Samtani, Sagar, et al., "AZSecure Hacker Assets Portal: Cyber threat intelligence and malware analysis", Samtani Conference: 2016 IEEE Conference on Intelligence and Security Informatics (ISI)., Sep. 1, 2016, 19-24.

Samtani, Sagar, et al., "Exploring Emerging Hacker Assets and Key Hackers for Proactive Cyber Threat Intelligence", Journal of Management Information Systems, 34(4)., Jan. 2, 2018, 1023-1053.

Samtani, Sagar, et al., "Exploring hacker assets in underground forums", In Intelligence and Security Informatics (ISI), 2015 IEEE International Conference on. IEEE, DOI:10.1109/ISI.2015.7165935., May 2015, Exploring hacker assets in underground forums.

Saripalli, Prasad, et al., "QUIRC: A Quantitative Impact and Risk Assessment Framework for Cloud Security", Conference: IEEE International Conference on Cloud Computing, Cloud 2010, Miami, FL, USA, DOI:10.1109/CLOUD.2010.22., Jul. 10, 2010, 5-10.

Scandariato, Riccardo, et al., "Predicting Vulnerable Software Components via Text Mining", IEEE Transactions on Software Engineering, 40(10), DOI:10.1109/TSE.2014.2340398., Oct. 1, 2014, 993-1006.

Scarfone, Karen, et al., "An analysis of CVSS version 2 vulnerability scoring", Conference: Proceedings of the Third International Symposium on Empirical Software Engineering and Measurement, ESEM 2009, Lake Buena Vista, Florida, USA., Oct. 2009, 516-525.

Shakarian, Paulo, et al., "Cyber Attribution: An Argumentation-Based Approach", Chapter 8, Part of the Advances in Information Security book series (ADIS, vol. 56)., Jan. 1, 2015, 151-171.

Shakarian, Paulo, et al., "Using generalized annotated programs to solve social network diffusion optimization problems", ACM Transactions on Computational Logic, vol. 14, Issue 2, Article No. 10, https://doi.org/10.1145/2480759.2480762., Jun. 1, 2013, 1-40.

Shlens, Jonathon, "A Tutorial on Principal Component Analysis", arXiv preprint arXiv: 1404.1100., Apr. 7, 2014, 1-12.

Sood, Aditya K., et al., "Cybercrime: Dissecting the State of Underground Enterprise", IEEE Internet Computing 17 (1), DOI:10.1109/MIC.2012.61., Jan. 2013, 60-68.

Soule, Augustin, et al., "Combining Filtering and Statistical Methods for Anomaly Detection", Proceedings of the 5th Conference on Internet Measurement 2005, Berkeley, California, USA, Oct. 19-21, USENIX Association., 2005, 1-14.

Stolzenburg, Frieder, "Computing Generalized Specificity", Journal of Applied Non-Classical Logics, 13(1), DOI: 10.3166/jancl.13.87-113., Jan. 2003, 87-113.

Stringhini, Gianluca, et al., "EvilCohort: Detecting Communities of Malicious Accounts on Online Services", 24th USENIX Security Symposium, USENIX Association, in Usenix Security, ISBN 978-1-939133-11-3., Aug. 13, 2015, 563-578.

Tang, John, et al., "Temporal Distance Metrics for Social Network Analysis", Proceedings of the 2nd ACM workshop on Online social networks, ACM, WOSN 2009, Barcelona, Spain., Aug. 17, 2009, 31-36.

Thonnard, Olivier, et al., "Are You at Risk? Profiling Organizations and Individuals Subject to Targeted Attacks", International Conference on Financial Cryptography and Data Security, Springer, Berlin, Heidelberg, DOI:10.1007/978-3-662-47854-7_2., Jan. 2015.

Tibshirani, Robert, et al., "An Ordered Lasso and Sparse Time-Lagged Regression", Technometrics 58, No. 4, doi:10.1080/00401706.2015.1079245., Oct. 11, 2016, 415-423.

Trieu, Lap Q., et al., "News Classification from Social Media Using Twitter-based Doc2Vec Model and Automatic Query Expansion", In Proceedings of the Eighth International Symposium on Information and Communication Technology, https://doi.org/10.1145/3155133.3155206., Dec. 2017, 460-467.

Veeramachaneni, Kalyan, et al., "AI2W: training a big data machine to defend", 2016 IEEE 2nd International Conference on Big Data Security on Cloud (BigDataSecurity), IEEE International Conference on High Performance and Smart Computing (HPSC), and IEEE International Conference on Intelligent Data and Security (IDS), Apr. 9, 2016, 49-54.

Walden, James, et al., "Predicting Vulnerable Components: Software Metrics vs Text Mining", 2014 IEEE 25th International Symposium on Software Reliability Engineering, Naples, Italy, doi: 10.1109/ISSRE.2014.32., 2014, 23-33.

Widup, Suzanne, et al., "2015 Verizon Data Breach Investigations Report", Verizon Risk Team, Verizon Enterprise Solutions, 2015, 1-64.

(56) References Cited

OTHER PUBLICATIONS

Xu, Tingyang, et al., "Longitudinal LASSO: Jointly Learning Features and Temporal Contingency for Outcome Prediction", Proceedings of the 21th ACM SIGKDD International Conference on Knowledge Discovery and Data Mining, ACM., 2016, 66-75.

Xu, Jennifer, et al., "The Topology of Dark Networks", Communications of the ACM, vol. 51 No. 10, 10.1145/1400181.1400198., 2008, 58-65.

Yamaguchi, Fabian, et al., "Modeling and Discovering Vulnerabilities with Code Property Graphs", In Security and Privacy (SP), 2014 IEEE Symposium on. IEEE, University of Gottingen, Qualcomm Research Germany, DOI:10.1109/SP.2014.44, Corpus ID: 2231082., May 18, 2014, 590-604.

Yang, Zhao, et al., "A Comparative Analysis of Community Detection Algorithms on Artificial Networks", Scientific Reports vol. 6, Article No. 30750., Aug. 1, 2016, 1-18.

Yip, Michael, et al., "Why Forums? An Empirical Analysis into the Facilitating Factors of Carding Forums", Proceedings of the 5th Annual ACM Web Science Conference, ACM., May 2, 2013, 1-10.

Zhang, Su, et al., "An Empirical Study on Using the National Vulnerability Database to Predict Software Vulnerabilities", In International Conference on Database and Expert Systems Applications, Conference: Database and Expert Systems Applications—22nd International Conference, DEXA 2011, Toulouse, France, Aug. 29-Sep. 2, 2011, Proceedings, Part I, Springer., Aug. 29, 2011, 217-231.

Zhang, Daoqiang, et al., "Temporally-constrained group sparse learning for longitudinal data analysis", International Conference on Medical Image Computing and Computer-Assisted Intervention, Springer, Berlin, Heidelberg., 2012, 264-271.

Collobert, Ronan, et al., "A unified architecture for natural language processing: Deep neural networks with multitask learning", International Conference on Machine Learning, '08: Proceedings of the 25th international conference on Machine learning, DOI:10.1145/1390156.1390177., Jul. 5, 2008, 160-167.

Cortes, Corinna, et al., "Support-vector networks", Machine Learning 20(3), https://doi.org/10.1007/BF00994018., 1995, 273-297.

Danezis, George, et al., "SybilInfer: Detecting Sybil Nodes using Social Networks", Conference: Proceedings of the Network and Distributed System Security Symposium, NDSS 2009, San Diego, California, USA, Feb. 9, 2009, 1-15.

Dung, Phan Minh, "On the acceptability of arguments and its fundamental role in nonmonotonic reasoning, logic programming and n-person games", Artificial intelligence, 77(2)., Sep. 1995, 321-357.

Durumeric, Zakir, et al., "The Matter of Heartbleed", IMC '14: Proceedings of the 2014 Conference on Internet Measurement Conference, https://doi.org/10.1145/2663716.2663755, ACM., Nov. 7, 2014, 475-488.

Edkrantz, Michel, et al., "Predicting Cyber Vulnerability Exploits with Machine Learning", 13th Scandinavian Conference on Artificial Intelligence, vol. 278, DOI 10.3233/978-1-61499-589-0-48., 2015, 48-57.

Ferrara, Emilio, et al., "The Rise of Social Bots", Communications of the ACM, 59(7), DOI:10.1145/2818717., Jul. 2014, 96-104.

Frei, Stefan, et al., "Modeling the security ecosystem-the dynamics of (in) security", , et al., 2010. . In Economics of Information Security and Privacy. Springer, DOI: 10.1007/978-1-4419-6967-5_6., 2010, 79-106.

Galar, Mikel, et al., "A Review on Ensembles for the Class Imbalance Problem: Bagging-, Boosting-, and Hybrid-Based Approaches", IEEE Transactions on Systems, Man, and Cybernetics, Part C (Applications and Reviews), vol. 42, No. 4, doi: 10.1109/TSMCC.2011.2161285., Jul. 1, 2012, 463-484.

Ghaffarian, Seyed Mohammad, et al., "Software Vulnerability Analysis and Discovery Using Machine-Learning and Data-Mining Techniques: A Survey", ACM Computing Surveys (CSUR), 50(4) Article No. 56., Aug. 25, 2017, 1-36.

Grier, Chris, et al., "Manufacturing compromise: the emergence of exploit-as-a-service", Proceedings of the 2012 ACM conference on Computer and communications security, ACM., 2012, 1-12.

Guo, Dongning, et al., "Mutual Information and Minimum Mean-square Error in Gaussian Channels", IEEE Transactions on Information Theory 51(4), DOI:10.1109/TIT.2005.844072., Dec. 23, 2004, 1261-1282.

Hao, Shuang, et al., "Predator: Proactive Recognition and Elimination of Domain Abuse at Time-Of-Registration", Conference: the 2016 ACM SIGSAC Conference, Conference on Computer and Communications Security, DOI:10.1145/2976749.2978317., Oct. 24, 2016, 1568-1579.

Haslebacher, Andreas, et al., "All your cards are belong to us: Understanding online carding forums", Electronic Crime Research (eCrime), 2017 APWG Symposium on. IEEE., 2016, 41-51.

Herley, Cormac, et al., "Nobody Sells Gold for the Price of Silver: Dishonesty, Uncertainty and the Underground Economy", Economics of Information Security and Privacy, by Moore, Tyler; Pym, David; Ioannidis, Christos, ISBN 978-1-4419-6966-8. Springer Science+Business Media, LLC., 2010, 33-53.

Hodge, Victoria, et al., "A Survey of Outlier Detection Methodologies", The Artificial Intelligence Review; Dordrecht vol. 22, Iss. 2, DOI:10.1023/B:AIRE.0000045502.10941.a9, Oct. 2004, 85-126.

Holt, Thomas J., et al., "Examining the Social Networks of Malware Writers and Hackers", International Journal of Cyber Criminology 6(1)., 2012, 891-903.

Huang, Ling, et al., "In-Network PCA and Anomaly Detection", Advances in Neural Information Processing Systems 19 (NIPS 2006)., Jan. 11, 2007, 617-624.

Kavanagh, Kelly M., et al., "Magic Quadrant for Security Information and Event Management", 2017 Gartner, Inc., ID: G00315428., Dec. 4, 2017, 1-35.

Khandpur, Paul Rupinder, et al., "Crowdsourcing Cybersecurity: Cyber Attack Detection using Social Media", Crowdsourcing Proceedings of the 2017 ACM on Conference on Information and Knowledge Management, Association for Computing Machinery, 2017., Nov. 10, 2017, 1049-1057.

Kostov, Nick, et al., "Cyberattack victims begin to assess financial damage", Wall Street Journal., May 15, 2017.

Kotenko, Igor, et al., "Analyzing Vulnerabilities and Measuring Security Level at Design and Exploitation Stages of Computer Network Life Cycle", International Workshop on Mathematical Methods, Models, and Architectures for Computer Network Security. Springer, Berlin, Heidelberg., 2005, 1-15.

Lakhina, Anukool, et al., "Diagnosing Network-Wide Traffic Anomalies", Conference on Applications, Technologies, Architectures, and Protocols for Computer Communication, ACM SIGCOMM Computer Communication Review, vol. 34, No. 4, ACM., Aug. 30, 2004, 219-230.

Larson, Selena, "Researchers find possible North Korea link to massive cyberattack", CNN Business, Last Accessed: Jan. 2024 https://money.cnn.com/2017/05/15/technology/wannacry-hack-responsible-hackers/index.html, 1-3.

Le, Quoc, et al., "Distributed Representations of Sentences and Documents", Proceedings of the 31st International Conference on Machine Learning, Beijing, China, 2014. JMLR: W&CP vol. 32., 2014, 1188-1196.

Lee, Hana, et al., "Engineering doc2vec for automatic classification of product descriptions on O2O applications", Electronic Commerce Research, DOI:10.1007/s10660-017-9268-5., 2017, 1-24.

L'Huillier, Gaston, et al., "Topic-Based Social Network Analysis for Virtual Communities of Interests in the Dark Web Abstract", ACM SIGKDD Explorations Newsletter 12, Mar. 2011, 66-73.

Liu, Yang, et al., "Cloudy with a Chance of Breach: Forecasting Cyber Security Incidents", 24th USENIX Security Symposium (USENIX Security 15), USENIX Association, Washington, D.C., https://www.usenix.org/conference/usenixsecurity 15/technical-sessions/presentation/liu., Aug. 12, 2015, 1009-1024.

Liu, Yang, et al., "Predicting Cyber Security Incidents Using Feature-Based Characterization of Network-Level Malicious Activities", Proceedings of the 2015 ACM International Workshop on International Workshop on Security and Privacy Analytics, ACM, DOI:10.1145/2713579.2713582., Mar. 2015.

(56) References Cited

OTHER PUBLICATIONS

MacDonald, Mitch, et al., "Identifying Digital Threats in a Hacker Web Forum", In Advances in Social Networks Analysis and Mining (ASONAM), 2015 IEEE/ACM International Conference, IEEE, 2015., Aug. 2015, 926-933.

MacDonald, Brian, et al., "Spreaders in the Network SIR Model: An Empirical Study", ArXiv abs/1208.4269, Aug. 22, 2012, 1-22.

Marin, Ericsson, et al., "Mining Key-Hackers on Darkweb Forums", In International Conference on Data Intelligence and Security (ICDIS), IEEE, 2018., 2018, 73-80.

Marin, Ericsson, et al., "Product Offerings in Malicious Hacker Markets", 2016 IEEE Conference on Intelligence and Security Informatics (ISI)., Jul. 26, 2016, 187-189.

Martin, Guy, et al., "Effective cybersecurity is fundamental to patient safety", BMJ, doi: 10.1136/bmj.j2375. PMID: 28515333., May 17, 2017, 357.

Meier, Lukas, et al., "The Group Lasso for Logistic Regression", Journal of the Royal Statistical Society Series B: Statistical Methodology, vol. 70, Issue 1, https://doi.org/10.1111/j.1467-9868.2007.00627.x., Jan. 4, 2008, 53-71.

Mell, Peter, et al., "A Complete Guide to the Common Vulnerability Scoring System Version 2.0", Last Accessed: Jan. 16, 2024. https:// www.first.org/cvss/v2/guide., Jun. 2007, 1-23.

Mikolov, Tomas, et al., "Distributed Representations of Words and Phrases and their Compositionality", Advances in Neural Information Processing Systems 26, 2013, 3111-3119.

Mikolov, Tomas, et al., "Efficient Estimation of Word Representations in Vector Space", International Conference on Learning Representations, 1301.3781., Jan. 16, 2013, 1-12.

Mittal, Sudip, et al., "CyberTwitter: Using Twitter to generate alerts for Cybersecurity Threats and Vulnerabilities", Conference: International Symposium on Foundations of Open Source Intelligence and Security Informatics, at: San Francisco, California, USA., Aug. 2016, 860-867.

Mnih, et al., "Three New Graphical Models for Statistical Language Modelling", Conference: Machine Learning, Proceedings of the Twenty-Fourth International Conference, International Conference on Machine Learning, Corvallis, Oregon, USA, DOI:10.1145/1273496.1273577., Jun. 20, 2007, 641-648.

Moores, Geoffrey, et al., "Finding Near-Optimal Groups of Epidemic Spreaders in a Complex Network", PLoS ONE 9(4), e90303., Apr. 2, 2014, 1-10.

Nagaraja, Shishir, "Anonymity in the Wild: Mixes on unstructured networks", Proceedings of the 7th international conference on Privacy enhancing technologies, International workshop on privacy Enhancing Technologies, Springer, Berlin, Heidelberg, DOI https://doi.org/10.1007/978-3-540-75551-7_16., 2007, 254-271.

Nagaraja, Shishir, et al., "BotGrep: Finding P2P Bots with Structured Graph Analysis", vol. 10., 19th USENIX Security Symposium, Washington, DC, USA., 2010, 95-110.

Nayak, Kartik, et al., "Some Vulnerabilities Are Different Than Others Studying Vulnerabilities and Attack Surfaces in the Wild", In International Workshop on Recent Advances in Intrusion Detection, Springer., 2014, 426-446.

Neuhaus, Stephan, et al., "Predicting Vulnerable Software Components", In Proceedings of the 14th ACM conference on Computer and communications security., 2007, 529-540.

Nouh, Mariam, et al., "Identifying Key-Players in Online Activist Groups on the Facebook Social Network", In Data Mining Workshop (ICDMW), 2015 IEEE International Conference on IEEE, DOI 10.1109/ICDMW.2015.88., 2015, 969-978.

Okutan, Ahmet, et al., "Forecasting Cyber Attacks with Imbalanced Data Sets and Different Time Granularities", arXiv preprint arXiv: 1803.09560., Mar. 26, 2018, 1-14.

Page, Larry, et al., "The PageRank citation ranking: Bringing order to the web", Technical Report, Stanford InfoLab., Jan. 29, 1998, 1-17.

Pedregosa, Fabian, et al., "Scikit-learn: Machine learning in Python", Journal of Machine Learning Research vol. 12., Oct. 2011, 2825-2830.

Phillips, Elizabeth, et al., "Extracting Social Structure from DarkWeb Forums", SOTICS 2015 : The Fifth International Conference on Social Media Technologies, Communication, and Informatics, Cyber Security Centre, Department of Computer Science, University of Oxford, UK, IARIA, 2015. ISBN: 978-1-61208-443-5., 2015, 97-102.

Hogan Emilie, et al., "Graph Coarsening for Path Finding in Cybersecurity Graphs", (CSIIRW '13). Association for Computing Machinery, New York, NY, USA, Article 7, https://doi.org/10.1145/2459976.2459984, 1-4.

Deliu, Isuf, et al., "Extracting cyber threat intelligence from hacker forums: Support vector machines versus convolutional neural networks", 2017 IEEE International Conference on Big Data (Big Data), Boston, MA, USA, doi: 10.1109/BigData.2017.8258359, 2017, 3648-3656.

Grisham, John, et al., "Identifying mobile malware and key threat actors in online hacker forums for proactive cyber threat intelligence", 2017 IEEE International Conference on Intelligence and Security Informatics (ISI), Beijing, China, doi: 10.1109/ISI.2017.8004867., 2017, 13-18.

Nunes, Eric, et al., "At-Risk System Identification via Analysis of Discussions on the Darkweb", 2018 APWG Symposium on Electronic Crime Research (eCrime), San Diego, CA, USA, doi: 10.1109/ECRIME.2018.8376211., 2018, 1-12.

* cited by examiner

Input: U, v, X, (as defined above) and ITER (number of iterations)
1. Set I=0, u=1, and TRIED = {}
2. For i in 1...ITER
   2.1. Select U', a random subset of U that is not in TRIED
   2.2. Add U' to TRIED
   2.3. Calculate $c_{v,U'}$ and $p_{s,U'}$
   2.4. If $c_{v,U'} \geq X$ then $I=I+p_{s,U'}$
   2.5. Else, $u=u-p_{s,U'}$
3. Return I, u

PSEUDOCODE
160

Input: U, v, X, K (as defined above) and ITER (number of iterations)
1. Set P=$P_{v,U}$ and TRIED = {} and RES={}
2. For i in 1...ITER
   2.1. Select subset U', of size K of set U that is not in TRIED
   2.2. Add U' to TRIED
   2.3. Calculate $P_{v,U-U'}$
   2.4. If $P_{v,U-U'} < P$ then set $P = P_{v,U-U'}$ and RES=U'
3. Return RES

ALGORITHM
320

FIG. 4B

GREEDY-PICK
Input: $U_{MPW}$, v, K (as defined above)
1. Order the elements (o) in set $U_{MPW}$ from greatest to least by *susceptible_vuln(o,v)*
2. Return the top K elements of $U_{MPW}$

ALGORITHM 330

FIG. 4C

SYSTEM AND METHOD FOR CALCULATING AND UNDERSTANDING AGGREGATION RISK AND SYSTEMIC RISK ACROSS A POPULATION OF ORGANIZATIONS WITH RESPECT TO CYBERSECURITY FOR PURPOSES OF DAMAGE COVERAGE, CONSEQUENCE MANAGEMENT, AND DISASTER AVOIDANCE

CROSS REFERENCE TO RELATED APPLICATIONS

This document is a PCT patent application that claims benefit to U.S. provisional application Ser. No. 62/850,431 filed on May 20, 2019, which is incorporated herein by reference in its entirety.

FIELD

The present disclosure generally relates to predictive cyber technologies; and in particular, to systems and methods for calculating risk and predicting costs to improve cybersecurity.

BACKGROUND

An increasing number of software (and hardware) vulnerabilities are discovered and publicly disclosed every year. In 2016 alone, more than 10,000 vulnerability identifiers were assigned and at least 6,000 were publicly disclosed by the National Institute of Standards and Technology (NIST). Once the vulnerabilities are disclosed publicly, the likelihood of those vulnerabilities being exploited increases. With limited resources, organizations often look to prioritize which vulnerabilities to patch by assessing the impact it will have on the organization if exploited. Standard risk assessment systems such as Common Vulnerability Scoring System (CVSS), Microsoft Exploitability Index, Adobe Priority Rating report many vulnerabilities as severe and will be exploited to err on the side of caution. This does not alleviate the problem much since the majority of the flagged vulnerabilities will not be attacked.

NIST provides the National Vulnerability Database (NVD) which comprises of a comprehensive list of vulnerabilities disclosed, but only a small fraction of those vulnerabilities (less than 3%) are found to be exploited in the wild—a result confirmed in the present disclosure. Further, it has been found that the CVSS score provided by NIST is not an effective predictor of vulnerabilities being exploited.

It is with these observations in mind, among others, that various aspects of the present disclosure were conceived and developed.

BRIEF DESCRIPTION OF THE DRAWINGS

FIG. 2B is an image of pseudocode illustrating aspects of the embodiment of FIG. 2A.

FIG. 4B is an exemplary computer-executable algorithm or pseudocode associated with the third embodiment of FIG. 4A.

FIG. 4C is an exemplary computer-executable algorithm or pseudocode associated with the third embodiment of FIG. 4A.

Corresponding reference characters indicate corresponding elements among the view of the drawings. The headings used in the figures do not limit the scope of the claims.

DETAILED DESCRIPTION

Figure 1:
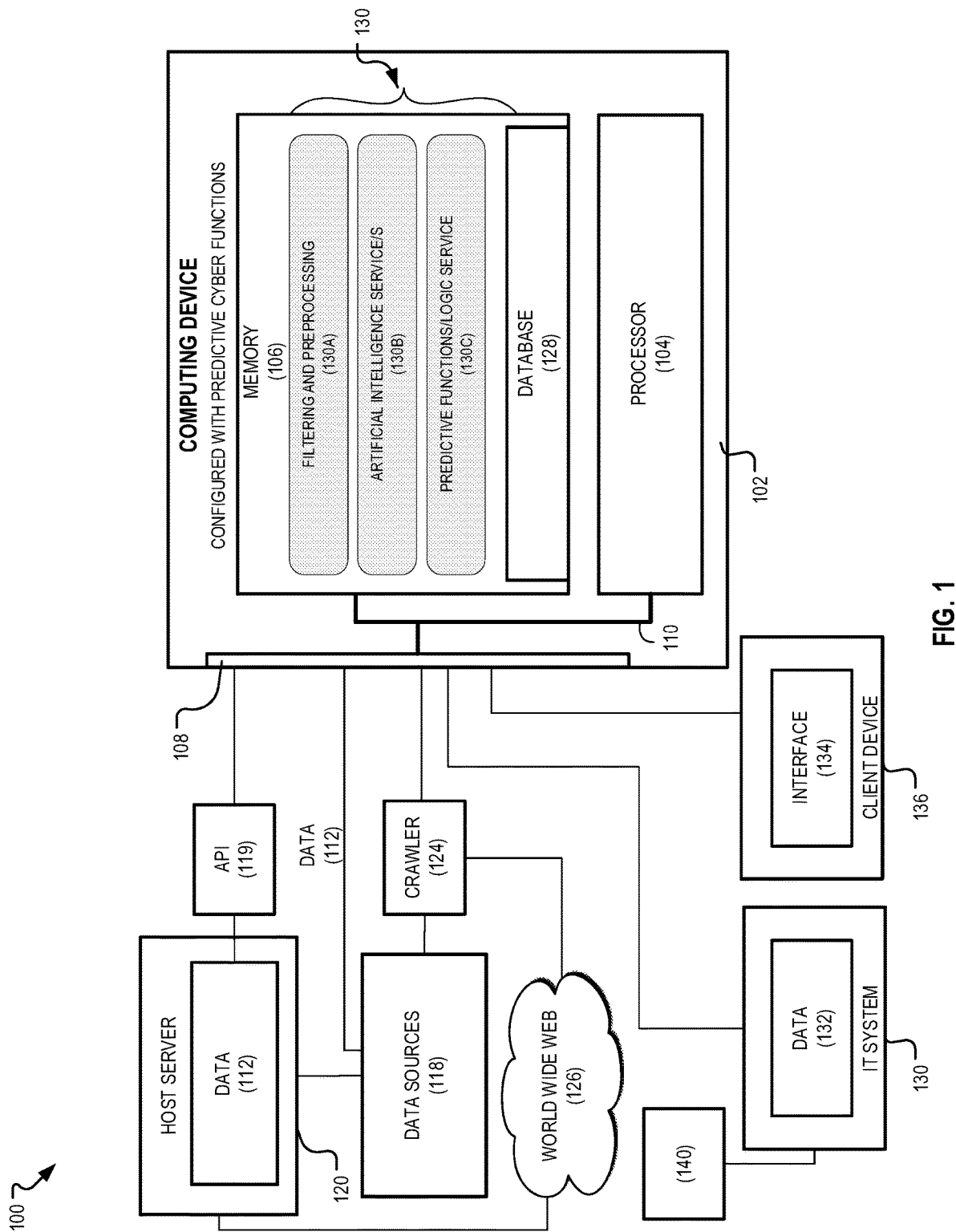
FIG. 1 is a simplified block diagram showing a general computer-implemented system for aggregating, and computing probabilities of risk of a cyber-related attack in view of predetermined costs.

Aspects of the present disclosure relate to embodiments of a computer-implemented system (hereinafter "system") and methods for predicting and/or determining cyber aggregation risk. In some embodiments, the system determines cyber aggregation risk by calculating the probability of a single attack costing a certain amount in terms of damage. In some embodiments, the system determines cyber aggregation risk by calculating the probability of a single attack costing a certain amount in terms of damage with respect to a single or multiple industry verticals. In some embodiments, the system identifies organizations to be incentivized to reduce aggregation risk. The system may also include or otherwise be associated with a graphical user interface for uploading and identifying sources of aggregation risk.

Introduction and Technical Challenges

Definitions

Vulnerability: throughout this document, the term "vulnerability" can be instantiated in a number of ways. Perhaps most obvious is a standard enumeration of software vulnerabilities such as the National. Vulnerability Database (NVD.), a reference vulnerability database maintained by the National Institute of Standards and Technology (see nvd.nist.gov). The NVD numbering system defines CVE identifiers.

The CVE numbering system follows one of these two formats:
CVE-YYYY-NNNN; and
CVE-YYYY-NNNNNNN.

The "YYYY" portion of the identifier indicates the year in which the software flaw is reported, and the N's portion is an integer that identifies a flaw (e.g., see CVE-2018-4917 related to https://nvd.nist.gov/vuln/detail/CVE-2018-4917, and CVE-2019-9896 related to https://nvd.nist.gov/vuln/detail/CVE-2019-9896).

However, other ways to identify or instantiate vulnerabilities are possible—such that the term vulnerability may be used to include any vulnerabilities identified by the software vendor, security firms, within an organization, or determined from a piece of software designed to probe vulnerabilities. Further, the term "vulnerability" can also be used to refer to a class of vulnerabilities and may not only include software flaws (may also include hardware or software/hardware combinations), but other flaws including but not limited to misconfigurations, to organizational practices, hardware, and physical security. It can also be used to describe a class of generalized computer issues that appeal to particular hackers or communities of hackers for purposes of compromising computer systems.

Software: throughout this document, the term "software" can be instantiated in a number of ways. Perhaps most obvious is a standard enumeration of software vulnerabilities such as NIST's NVD numbering system defining CPE numbers or identifiers. More specifically, a Common Platform Enumeration (CPE) is a list of software/hardware products that are vulnerable to a given CVE. The CVE and the respected platforms that are affected, i.e., CPE data, can be obtained from the NVD. For example, the following CPEs are some of the CPEs vulnerable to CVE-2018-4917:

cpe:2.3:a:adobe:acrobat_2017:*:*:*:*:*:*:*:*
cpe:2.3:a:adobe:acrobat_reader_dc:15.006.30033:*:*:*:
 classic: *:*:*
cpe:2.3:a:adobe:acrobat_reader_dc:15.006,30060:*:*:*:
 classic: *:*:*

However, other ways to identify software (vulnerabilities) are possible and may also include components used to create software including libraries, source code snippets, and SaaS-provided services. Further, the term "software" can also be used to refer to a class of software that may be determined by the vendor of the software, the author of the software (especially for custom code), the platform the software runs on, the type of applications, what services the software uses, the language the software is written in, coarsening based on version number, and/or combinations of these methods of classification.

Technical Challenges: Information technology (IT) administrators lack sufficient technical means for efficiently identifying and practically addressing possible vulnerabilities of a technology configuration associated with an IT system such as determining how to approach a given vulnerability (versus another). A given IT system may be potentially susceptible to thousands of security vulnerabilities (at least those identifiable via the NVD). While the NVD and CVSS provides baseline information about some threats, there is insufficient technology presently available that might allow IT administrators to actually make sense of and intelligently leverage such information to apply responsive measures and prioritize patches or other fixes, and predict actual attacks based on the specifics of a given technology configuration.

General Specifications of Computer-Implemented System Responsive to Technical Challenges Referring to FIG. 1, an inventive concept responsive to the aforementioned technical challenges may take the form of a computer-implemented system, designated system 100, comprising any number of computing devices or processing elements. In general, the system 100 leverages artificial intelligence to implement cyber predictive methods to e.g., predict risk and potential cost to an information technology (IT) system or environment. While the present inventive concept is described primarily as an implementation of the system, it should be appreciated that the inventive concept may also take the form of tangible, non-transitory, computer-readable media having instructions encoded thereon and executable by a processor, and any number of methods related to embodiments of the system described herein.

In some embodiments, the system 100 comprises (at least one of) a computing device 102 including a processor 104, a memory 106 of the computing device 102 (or separately implemented), a network interface (or multiple network interfaces) 108, and a bus 110 (or wireless medium) for interconnecting the aforementioned components. The network interface 108 includes the mechanical, electrical, and signaling circuitry for communicating data over links (e.g., wires or wireless links) within a network (e.g., the Internet). The network interface 108 may be configured to transmit and/or receive data using a variety of different communication protocols, as will be understood by those skilled in the art.

As indicated, via the network interface 108 or otherwise, the computing device 102 is adapted to access data 112 from a host server 120 or other remote computing device and the data 112 may be generally stored/aggregated within a storage device (not shown) or locally stored within the memory 106. The data 112 includes any information about cybersecurity events across multiple technology platforms referenced herein, information about known vulnerabilities associated with hardware and software components, any information from the NVD including updates, and may further include, without limitation, information gathered regarding possible hardware and software components/parameters being implemented by a given technology configuration associated with some entity such as a company. A technology configuration may include software and may define software stacks and individual software applications/pieces, may include hardware, and combinations thereof, and may generally relate to an overall network or IT infrastructure system or environment including telecommunications devices and other components, computing devices, and the like.

As shown, the computing device 102 is adapted, via the network interface 108 or otherwise, to access the data 112 from directly and/or indirectly from various data sources 118 (such as the deep or dark web (D2web), or the general Internet). In some embodiments, the computing device 102 accesses the data 112 by engaging an application programming interface 119 to establish a temporary communication link with a host server 120 associated with the data sources 118. Alternatively, or in combination, the computing device 102 may be configured to implement a crawler 124 (or spider or the like) to extract the data 112 from the data sources 118 without aid of a separate device (e.g., host server 120). Further, the computing device 102 may access the data 112 from any number or type of devices providing data (or otherwise taking the form of the data sources 118) via the general Internet or World Wide Web 126 as needed, with or without aid from the host server 120.

The data 112 may generally define or be organized into datasets or any predetermined data structures which may be aggregated or accessed by the computing device 102 and may be stored within a database 128. Once this data is accessed and/or stored in the database 128, the processor 104 is operable to execute a plurality of services 130, encoded as instructions within the memory 106 and executable by the processor 104, to process the data so as to determine correlations and generate rules or predictive functions, and compute metrics from these rules or functions based on predetermined inputs to e.g., compute a probability of a cyber-attack, as further described herein. The services 130 of the system 100 may generally include, without limitation, a filtering and preprocessing service 130A for, in general preparing the data 112 for machine learning or further use; an artificial service 130B comprising any number or type of artificial intelligence functions for modeling the data 112 (e.g., natural language processing, classification, neural networks, linear regression, etc.); and a predictive functions/logic service 130C that formulates predictive functions and outputs one or more values suitable for reducing risk, such as a probability of an attack, incident, or exploit of a vulnerability, an overall threat value defining a possible cost predicted from an exploitation of the vulnerability, and the like, as further described herein. The plurality of services 130 may include any number of components or modules executed by the processor 104 or otherwise implemented. Accordingly, in some embodiments, one or more of the plurality of services 130 may be implemented as code and/or machine-executable instructions executable by the processor 104 that may represent one or more of a procedure, a function, a subprogram, a program, a routine, a subroutine, a module, an object, a software package, a class, or any combination of instructions, data structures, or program statements, and the like. In other words, one or more of the plurality of services 130 described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium (e.g., the memory 106), and the processor 104 performs the tasks defined by the code.

As shown, the computing device 102 may be in operable communication with some device associated with at least one of an information technology (IT) system 130 or enterprise network. The IT system 130 may include any system architecture, IT system, or configuration where it is desired to assess possible vulnerabilities to the IT system 130, rank these vulnerabilities, and apply the functionality described herein to reduce risk to the IT system 130. The IT system 130 may further include data 132 defining some configuration of possible hardware and/or software components (e.g., various software stacks) that may be susceptible to vulnerabilities.

As further shown, the system 100 may include a graphical user interface ("interface") 134 which may be presented by way of a portal or gateway embodied as an API, a browser-based application, a mobile application, or the like. The interface 134 may be executable or accessible by a remote computing device (e.g., client device 136) and may provide predefined access to aspects of the system 100 for any number of users. For example, accessing the interface 134, a user may provide information about an external IT system (such as data 132) so that the computing device 102 can process this information according to the plurality of services 130 and return some output value useful for reducing risk of an attack based on a vulnerability to the IT system 130.

Technical Preliminaries

Some technical preliminaries shall be described, followed by exemplary embodiments of the system 100 that apply aspects of these technical preliminaries in some form to predict risk and potential costs in cybersecurity. These technical preliminaries may be defined as problem sets or initial models and may be implemented as code and/or machine-executable problem definitions and/or instructions executable by the processor 104.

As an initial matter, we can assume a population of organizations (i.e. organizations that control critical infrastructure, organizations for which a party may be responsible for damages, or any set of organizations for which one must consider aggregation risk) denoted as set U. Organizations may define or otherwise include at least one IT system or environment defining any number of software and/or hardware components, such as the IT system 130.

Likewise, we can further assume a sets of all possible pieces of software (denoted S), software vulnerabilities (denoted V), and industry verticals (denoted I). This information may be defined within the data 112 accessed by the computing device 102.

For each organization o in set U, we assume it is associated with a set of software, denoted $S_o$, and a set of software vulnerabilities $V_o$, and a set of industry verticals, $I_o$. For the sake of simplicity, we will generally assume each organization o is mapped to a single industry vertical, but in practice it can be many. There are simple methods to extend the framework to allow for many industry verticals (for example, having a symbol representing multiple industries). Therefore, we will treat $I_o$ as a single element of set I. Data 132 in FIG. 1 is an exemplary representation of this data for each organization o. In other words, information about an IT system 130 associated with each organization o, may be represented as data 132, and the data 132 may further define the set of software $S_o$ of the IT system 130, a set of software vulnerabilities $V_o$, and a set of industry verticals, $I_o$.

Formalism for Attack Cost

For a given organization o and piece of software s the function cost_sw(o,s) returns the cost of an attack against organization o if software s is exploited (note that we can expand this to sets of software as well). Likewise, for a given organization o and vulnerability v the function cost_vuln(o, v) returns the cost of an attack against organization o if vulnerability v is exploited; note that we can expand this to sets of vulnerabilities as well). We note that these functions can be instantiated in multiple ways. Some examples include:

Estimate of payment to organization o after an attack occurs,

Estimate of the total cost of damages specific to organization o,

Standard estimate of damages associated with organization o based on prior history of related attacks to similar software or vulnerabilities, A simple model such as "universal" cost (i.e. setting the value to 1.0) or based on the number of systems that have the software and/or vulnerability, and/or A combination of the above-described examples.

Formalism for Victim Susceptibility

For a given organization o and software s the function susceptible_sw(o,s) returns the probability that organization o is susceptible to an attack conducted leveraging exploits in software s. Likewise, for a given organization o and vulnerability v the function susceptible_vuln(o,v) returns the probability that organization o is susceptible to an attack conducted leveraging exploits on vulnerability v. We note that these functions can be expanded for sets of software and vulnerabilities and instantiated in multiple ways. Some examples include:

Estimating the probabilities based on various aspects of the organization's security program such as the number of personnel on the security team, their experience level, the annual security budget, adherence to compliance standards, the adoption of certain "best practices," the setup/segmentation of the organization's IT infrastructure, and/or the use of specialized security hardware or software, Estimating the probabilities based on the results of a survey issued to the organization covering various aspects of their security, Historical record of the organization's past effectiveness in being prepared for an attack, Historical records of the probability of an attack when such software and/or vulnerabilities are exploited, A simple model, such as the probability being 1 or 0 depending on whether or not the organization employs the software, and/or A combination of the above-mentioned examples.

Formalism for Threat

We assume the existence of a function threat_sw that maps pieces of software (from set S) to a probability. We note that the function threat_sw would be dynamically updated over time and can be instantiated in multiple ways, but the intuition is that it returns the probability that a given piece of software S will be exploited or otherwise leveraged in an attack by a hacker. Some examples of how the function threat_sw can be instantiated include:

Determining the probability of a piece of software being exploited based on availability of exploit, current vulnerabilities present within that piece of software and/or information collected from the Internet (to include but not limited to darkweb, deepweb, social media, chan sites, paste sites), Machine learning or artificial intelligence based approaches based on historical exploitation rates for that software, the vendor of that software, interest by hackers (malicious or otherwise), or other information, and/or Estimation of the probability of the software being exploited.

Likewise, we assume the existence of function threat_vuln that behaves in a similar manner to threat_sw except that it takes a software vulnerability (from set V) as input and returns the probability that the vulnerability is exploited. This function can also be dynamic and instantiated in a manner similar to threat_sw.

Exemplary Embodiments of the System (100)

Given the above Technical Preliminaries, various embodiments of the system 100 are contemplated that are responsive to the technical challenges set forth herein.

Figure 2A:
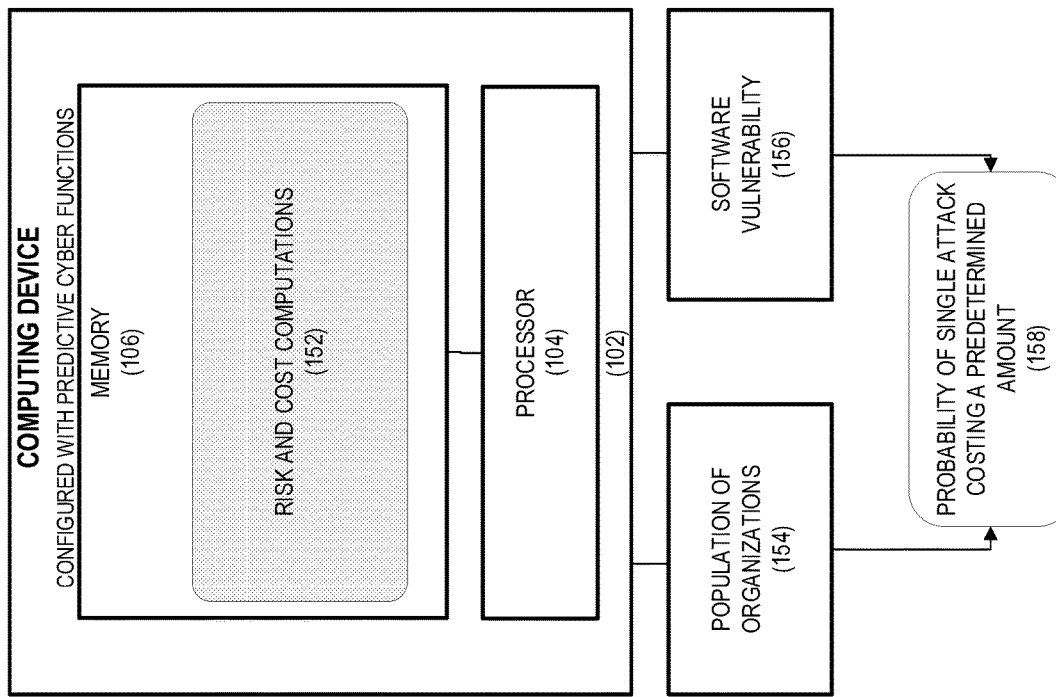
FIG. 2A is a simplified block diagram showing a first embodiment of the system of FIG. 1 configured to determine cyber aggregation risk by calculating the probability of a single attack costing a certain amount in terms of damage.

First embodiment: Referring to FIG. 2A, in a first embodiment 150 of the system 100, the system 100 is configured to determine cyber aggregation risk by, generally, calculating the probability of a single attack costing a predetermined certain amount in terms of potential damage.

Exact calculation based on a software vulnerability. Applying any number of functions, expressions, or logic as represented by risk and cost functions 152 in FIG. 2A (and indicated below from expressions 1.1 to 1.12) and executable by the processor 104, and given a population of organizations denoted as U and illustrated as 154, and a single software vulnerability (denoted v, a member of set V) and illustrated as 156, an overall probability of a payout equal to at least X (represented as 158) can be computed as follows:

(1.1) Exact calculation based on a software vulnerability.
Given a population of organizations (U) and a single software vulnerability (denoted v, a member of set V), we need to compute the overall probability of a payout equal to at least X.

(1.2) For a given subset U' of organizations, we can compute the cost of an attack leveraging vulnerability v as:

$$c_{v,U'} = \sum_{o \in U'} \text{cost\_vuln}(o, v)$$

(1.3) Likewise, assuming independence between the probability of an attacker using a vulnerability and the probability of individual organizations being susceptible, the probability of such an attack occurring that affects precisely the systems in U' can be computed as:

$$p_{v,U'} = \text{threat\_vuln}(v) \times$$
$$\prod_{o \in U'} \text{susceptible\_vuln}(o, v) \times \prod_{o \notin U'} (1 - \text{susceptible\_vuln}(o, v))$$

(1.4) Hence, the overall probability of an attack using vulnerability v with an associated payout of at least X can be calculated as:

$$\sum_{U' | c_{v,U'} \geq X} p_{v,U'}$$

(1.5) Likewise, we can calculate the probability based on an attack on software s in a similar manner, except we modify the calculations as follows:

$$c_{s,U'} = \sum_{o \in U'} \text{cost\_sw}(o, s)$$

$$p_{s,U'} = \text{threat\_sw}(s) \times \prod_{o \in U'} \text{susceptible\_sw}(o, s) \times \prod_{o \notin U'} (1 - \text{susceptible\_sw}(o, s))$$

(1.6) The calculations of 1.5 give rise to an overall "probability of attack with an associated payout of at least X" computation for the scenario where the threat is determined by software as:

$$P_{v,U} = \sum_{U' \in U | c_{v,U'} \geq X} p_{s,U'}$$

(1.7) Note that this problem maps directly to a variant of the "subset sum" problem, in which the input is a set of numbers (N) and a target amount (T), and the output is all subsets of numbers that sum to T or greater.

(1.8) In the mapping to the subset-sum problem, the target T is X (the payout lower bound) and the set of numbers (N) is the following (replace cost_vuln with cost_sw for the software variant):

$$\bigcup_{o \in U'} \{\text{cost\_vuln}(o, v)\}$$

(1.9) Standard exponential-time algorithms can be used to solve this problem exactly thru enumeration, as well as simple variants of the dynamic programming algorithm commonly used to solve the subset-sum problem. We note that the result of approximation methods could still yield an exponential number of combinations and the runtime of such an algorithm could also take exponential time.

(1.10) We note a simple sampling method can be used to compute a probability bounds (we shall denote them I and u for the lower and upper bounds of probability, respectively. Consider the pseudo-code 160 of FIG. 2B (shown for vulnerability-based version—note the simple changes in 1.5 and 1.6 for the software-based version). This pseudocode 160 is executable by the processor 104 to compute the probability bounds, I and u. A variation to the pseudo-code of FIG. 2B is contemplated where "TRIED" is omitted.

(1.11) Several variants to the above sampling algorithm can be applied—for example where the sampling is biased in a way to produce the subsets where $p_{s,U'}$ (i.e. at step 2.1) is the greatest in the earlier iterations.

Figure 2C:
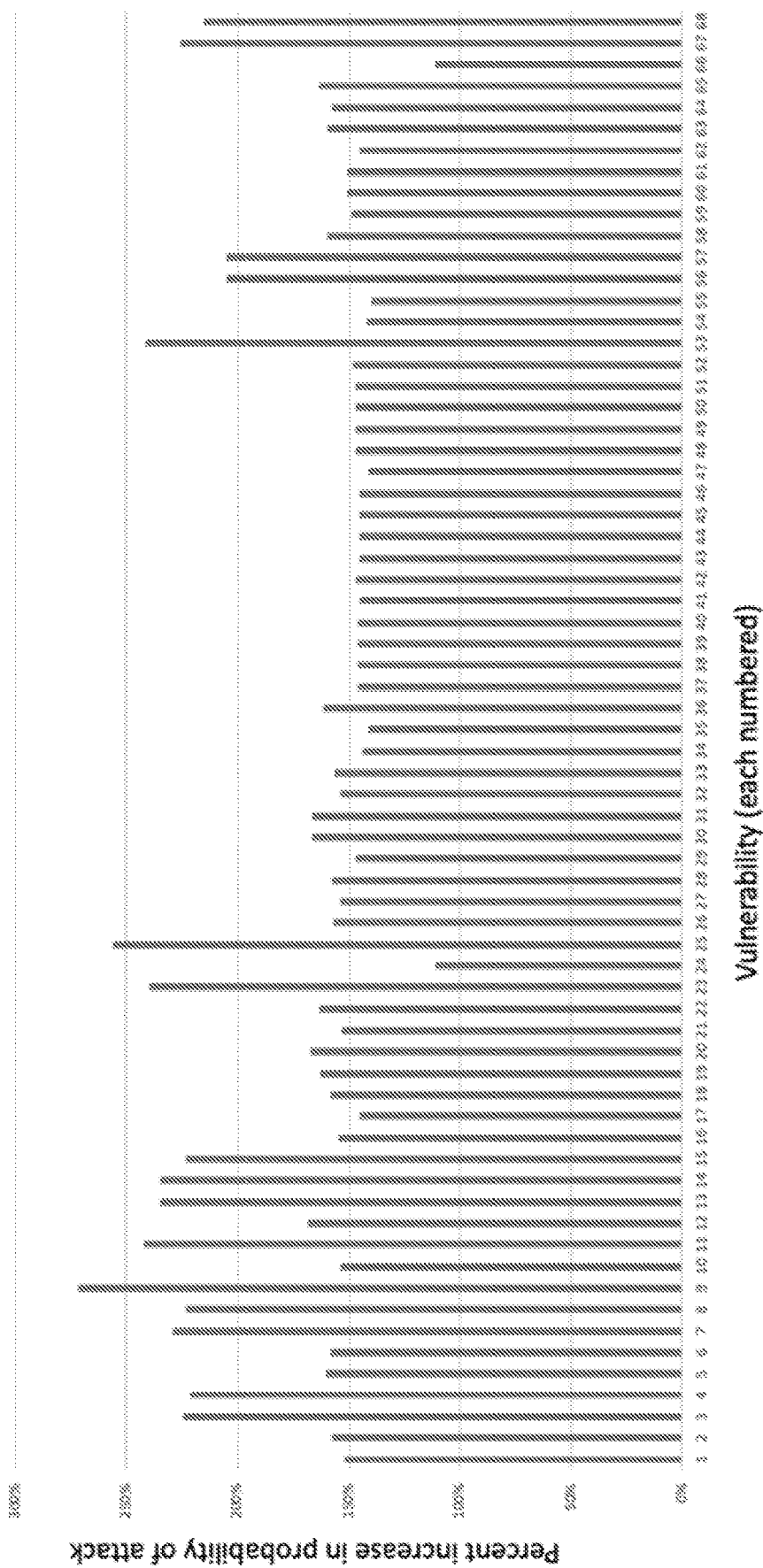
FIG. 2C is a graph illustrating an evaluation including depiction of a percentage increase in probability of attack using the functionality of the embodiment of FIG. 2A.

(1.12) Referring to FIG. 2C an evaluation was conducted on four organizations, assigning each a unit cost of "1" for an attack and setting susceptible(v,o) as 1 if organization o had vulnerability v and 0 otherwise. For 68 software vulnerabilities, we examined the probability of experiencing an attack that had a cost of 2 units or greater. We compared these probabilities with a baseline method that assumed independence among the organizations. For each software vulnerability, we show the percent increase in the probability of attack using our method in the figure below. In all cases, the probability was at least twice as great as the on yielded by the baseline method.

Figure 3:
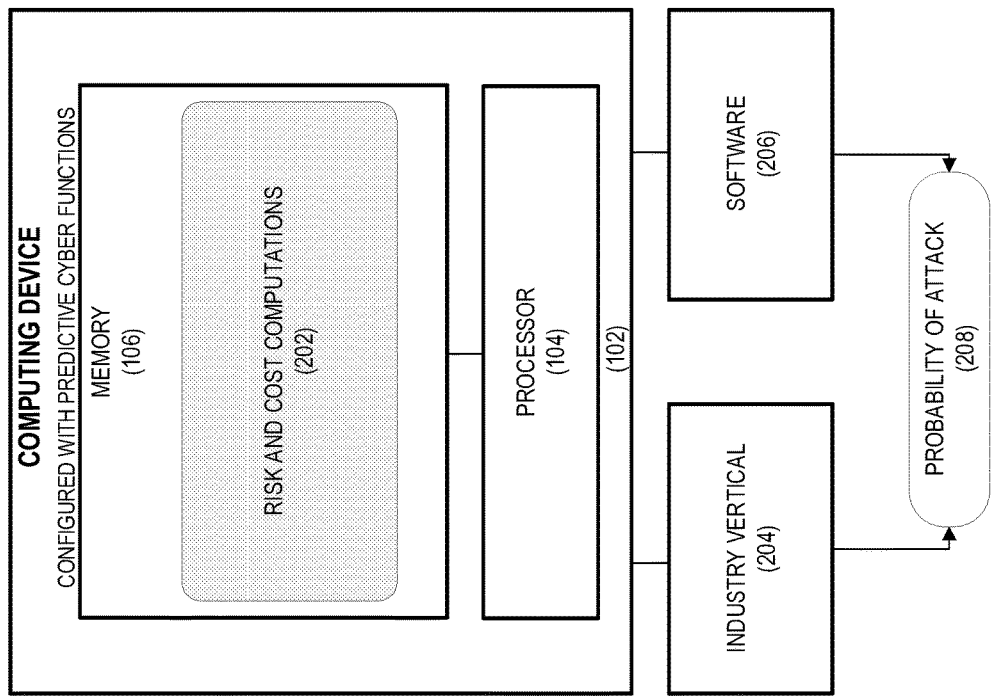
FIG. 3 is a simplified block diagram of a second embodiment of the system of FIG. 1 configured to determine cyber aggregation risk by calculating the probability of a single attack costing a certain amount in terms of damage with respect to a single or multiple industry vertical.

Second embodiment: In a second embodiment 200 of the system 100, in general, applying any number of functions, expressions, or logic as represented by risk and cost functions 202 in FIG. 3 (and indicated below from expressions 2.1 to 2.8) and executable by the processor 104, and given at least one industry vertical denoted below as i and illustrated as 204, and software 206 denoted below as software s (and further associated with vulnerability v), the system 100 is configured to determine a cyber aggregation risk by computing a probability of a single attack 208 costing a certain amount in terms of damage with respect to a single or multiple industry verticals, as follows:

(2.1) Let P(i) be the probability of an organization in set U being in industry vertical i (i is in set 1). This is equivalent to the fraction of organizations in U in industry vertical i. Each organization is assigned to one industry vertical (note we can easily extend to allow multiple industry verticals by having symbols that can represent more than one vertical).

(2.2) For a given industry vertical i and software s (resp. vulnerability v), let $P_i(s)$ (resp. $P_i(v)$) be the fraction of companies in industry vertical i running software s (resp. having vulnerability v).

(2.3) We will overload the notation susceptible_sw, susceptible_vuln, cost_sw, and cost_vuln, for industry verticals—where each company in that industry vertical has the same susceptibility and cost for a given software or vulnerability. For industry vertical i, this will be denoted susceptible_sw(i,s), susceptible_vuln (i,v), cost_sw(i,s), and cost_vuln(i,v).

(2.4) Hence, for a single industry vertical i and vulnerability v, we can compute the probability of an attacker targeting m specific organizations in that industry vertical as:

$$p_{v,i,m} = \binom{P(i) \times P_i(v) \times |U|}{m} \times \text{threat\_vuln}(v) \times$$
$$\text{susceptible\_vuln}(i,v)^m \times (1 - \text{susceptible\_vuln}(i,v))^{P(i) \times P_i(v) \times |U| - m}$$

(2.5) Analogously, for a single industry vertical i and software s, we can compute the probability of an attacker targeting m specific organizations in that industry vertical as:

$$p_{v,i,m} = \binom{P(i) \times P_i(s) \times |U|}{m} \times \text{threat\_sw}(s) \times$$
$$\text{susceptible\_sw}(i,s)^m \times (1 - \text{susceptible\_sw}(i,s))^{P(i) \times P_i(s) \times |U| - m}$$

(2.6) For a given industry vertical, the probability of an attack occurring that utilizes vulnerability v that costs at least X can be computed as follows:

$$\sum_{m=\text{ceil}\left(\frac{X}{\text{cost\_vuln}(i,v)}\right)}^{P(i) \times P_i(v) \times |U|} p_{v,i,m}$$

Where ceil is the ceiling function. The following expression computes the probability when we consider software s:

$$\sum_{m=\text{ceil}\left(\frac{X}{\text{cost\_vuln}(i,s)}\right)}^{P(i) \times P_i(s) \times |U|} p_{s,i,m}$$

(2.7) When considering multiple industry verticals: 1, ..., i, ... |I|, we can compute the probability of an attack costing X amount as follows when considering vulnerability v:

$$\sum_{(m_1,\ldots,m_i,\ldots,m_{|I|}) | \sum_i m_i \times \text{cost\_vuln}(i,v) \geq X} \sum_i p_{v,i,m_i}$$

Likewise, with respect to software s the probability can be computed as follows:

$$\sum_{(m_1,\ldots,m_i,\ldots,m_{|I|}) | \sum_i m_i \times \text{cost\_sw}(i,s) \geq X} \sum_i p_{s,i,m_i}$$

(2.8) The expressions in 2.7 can be solved in much the same way as the problem presented in the description of the first embodiment 150 (e.g., expressions 1.9-1.11). Specifically, an enumeration approach (exponential time), a dynamic programming method used to solve subset-sum, and the sampling method from 1.10 (along with extensions) can be adapted.

Figure 4A:
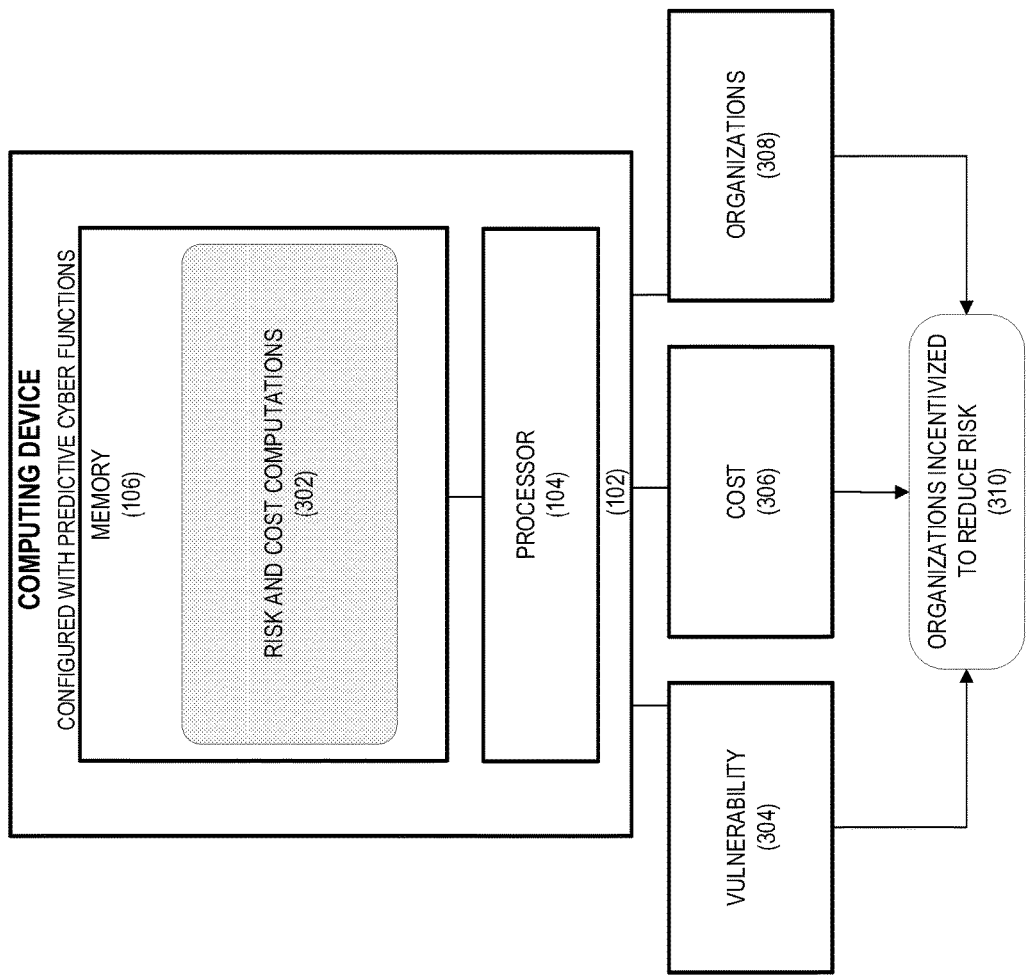
FIG. 4A is a simplified block diagram of a third embodiment of the system of FIG. 1 configured to identify organizations to be incentivized to reduce aggregation risk.

Third embodiment: In a third embodiment 300 of the system 100, in general, applying any number of functions, expressions, or logic as represented by risk and cost functions 302 in FIG. 4A (and indicated below from expressions 3.1 to 3.52) and executable by the processor 104, and given at least a vulnerability 304 denoted below as v, a cost 306 denoted below as cost X, and select organizations 308 denoted as K organizations, the system 100 is configured to identify one or more organizations 310 to be incentivized to reduce aggregation risk (by addressing problems associated with probability reduction or cost reduction), as follows:

(3.1) The discussions in this section will be based on software vulnerability (i.e. using susceptible_vuln and cost_vuln) but can easily be adapted for use by software (i.e. using susceptible_sw and cost_sw) without loss of generalization.

(3.2) Also of note, extensions of this framework based on industry verticals is also possible.

(3.3) In this section, there are two key problems that we shall explore:

(3.3.1) Probability reduction: Given a vulnerability v and cost X, select K organizations such that if they resolve the vulnerability, it reduces the probability of an incident (that is due to v) that costs X or greater.

(3.3.2) Cost reduction: Given a vulnerability v and cost X, select K organizations such that if they resolve the vulnerability, it ensures that any incident (due to v) that has a cost X or greater and has a probability close to zero.

(3.4) Algorithms for "Probability Reduction": here we present several methods to address this problem.

(3.4.1) Enumeration approach. Note that finding an "optimal" solution to Probability Reduction is likely a difficult combinatorial optimization problem (i.e. likely NP-hard); hence, approaches for finding such an optimal solution may require exponential time in terms of the input. Further, evaluation of the "probability of attack" ($P_{v,U}$ from the first embodiment 150 and second embodiment 200) is also computationally difficult. In FIG. 4B, an algorithm 320 is presented that uses an enumeration approach in combination with a subroutine for computing a probability of attack (in practice, one can substitute algorithms or other expressions of the first embodiment 150 for said subroutine; i.e., this algorithm 320 can assume an oracle-implemented approach using expressions of the first embodiment 150). If the number of iterations is set at or above $$\sum_{i=1}^{K} \binom{k}{i}$$

then the method illustrated can be used.

(3.4.2) MPW approach. An alternative is to find the "most probable world" (MPW) of the worst-case scenario (where the total cost exceeds X). That is, there are many cases where v is used in an attack that can result in the worst case—but these scenarios are disjoint (hence the sum of the probabilities of each scenario can lead to such a case). The MPW of such a case will identify where a large portion of the probability lies—selecting organizations that reduce this scenario also reduces the overall probability (though it would not necessarily be optimal).

(3.4.2.1) Finding an MPW. Finding the MPW that corresponds with a certain minimum cost requirement can be solved with a simple set of integer constraints by maximizing the log-likelihood of $p_{v,U'}$ (see first embodiment 150) where U' is the subset of systems affected by an exploit for the software vulnerability. In this case, there is a variable $Y_o$ associated with each organization o in set U. The objective function is associated with the log-likelihood of $p_{v,U'}$ while the $$\max \log \text{threat\_vuln}(v) + \sum_{o \in U} (Y_o \times \log \text{susceptible\_vuln}(o, v) +$$

$$(1 - Y_o) \times \log(1 - \text{susceptible\_vuln}(o, v)))$$

$$\text{subject to } \sum_{o \in U} Y_o \times \text{cost\_vuln}(o, v) \geq X$$

$$\forall o, Y_o \in \{0,1\}$$

(3.4.2.2) Using the above constraints (in conjunction with an integer program solver like CPLEX or QSOPT) we can find the affected organizations in the MPW as each associated $Y_o$ will be returned as 1 by the solver. We shall refer to the set of all organizations in the MPW as $U_{MPW}$. Based on this set, we select the organizations to incentivize with the (greedy) algorithm 330 depicted in FIG. 4C, executable by the processor 104.

(3.4.3) With Simplifying Assumption on Susceptibility. Under certain strong/simplifying assumptions, we can compute exact solutions to the probability reduction problem exactly. For example, a common case is that susceptible_vuln(o,v) can only be either 0.0 or 1.0. In this case, we can apply the MPW approach, but forgo the solving of the integer constraints in step 3.4.2.1 as the MPW is the set of all organizations where susceptible_vuln(o,v)=1.0. Then, we can simply apply GREEDY-PICK from 3.4.2.2 and obtain an exact solution.

(3.5) Algorithms for "Cost Reduction": here we present several methods to address this problem.

(3.5.1) Integer programming method. As with "probability reduction," we can address "cost reduction" by finding a solution to a set of integer constraints. We will use the same notation as in 3.4.2. However, there is one key difference, we only consider organizations in set U where susceptible_vuln(o,v)>0.0.

$$\text{Min } \Sigma_o (1-Y_o) \times \text{cost\_vuln}(o,v)$$

Subject to: $\Sigma_o Y_o \leq K$

Each o such that the corresponding $Y_o$ variable is 1 can be considered part of the solution if the result of the objective function has a value less than X. If the value of the objective function is greater than X, then K must be increased, as this would indicate there is no set of K organizations that can reduce the cost to the desired level.

(3.5.2) Other methods. Various combinatorial methods can be used as alternatives to the above-described integer programming approach—for instance, methods used for subset-sum and related combinatorial problems.

Figure 5:
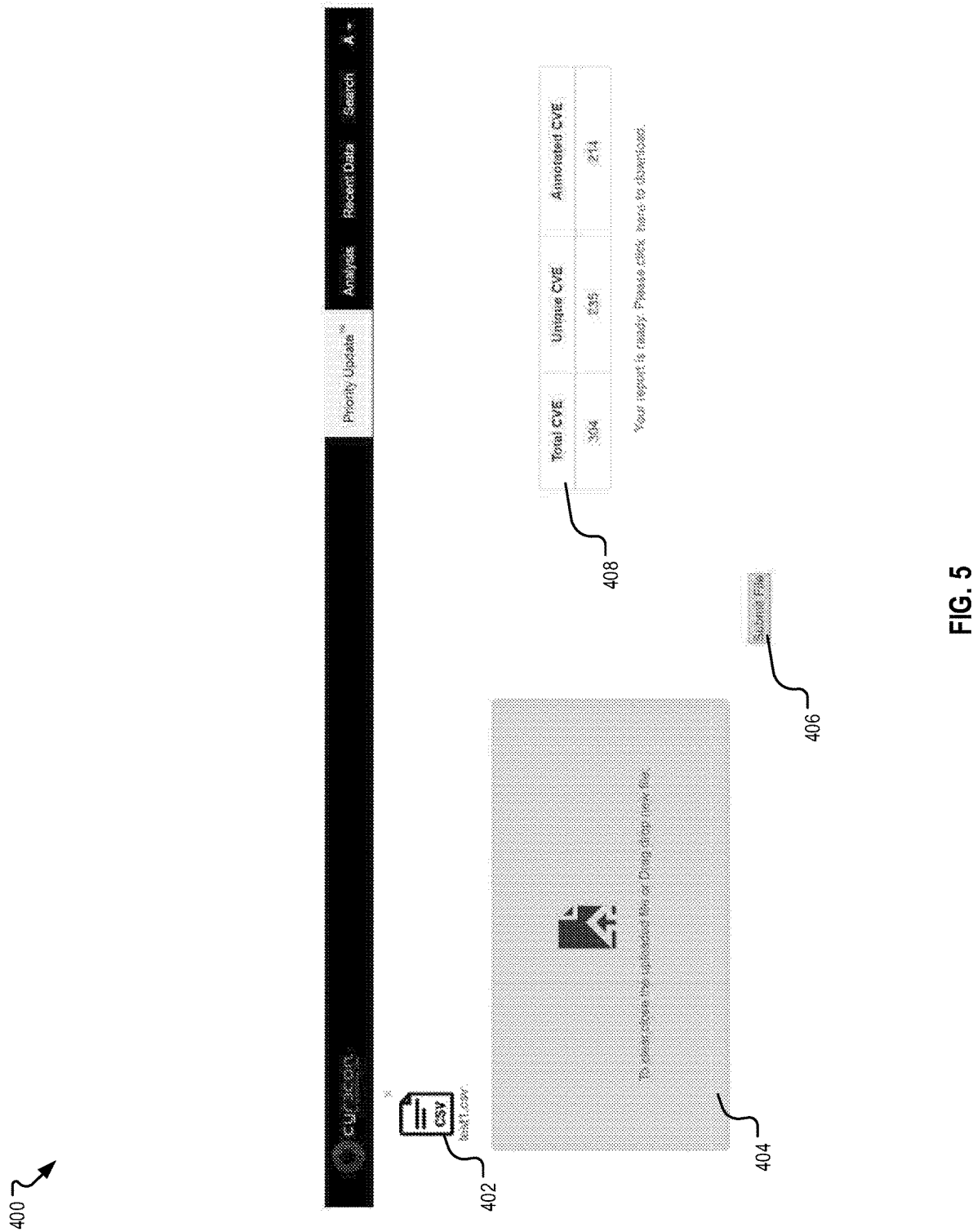
FIG. 5 is a screen shot of an exemplary interface for uploading and identifying sources of aggregation risk.

Referring to FIG. 5, a screenshot 400 illustrating one exemplary embodiment of the interface 134 is shown that may be implemented with any one or more of the embodiments (150, 200, and 300) of the system 100 described herein, and may be leveraged for, e.g., uploading and identifying sources of aggregation risk. Embodiments of the interface 134 described in this section is based on software vulnerabilities. However, the interface 400 can also apply to software, hardware, or combinations thereof. As previously described, the interface 134 may be presented by way of a portal or gateway embodied as an API, a browser-based application, a mobile application, or the like. In other words, the interface 134 can be web-based, but instantiations as stand-alone software are also possible. In general, the interface 134 accommodates input of data 132 defining aspects of some external IT system 130 associated with an organization, or other external data (which may be specific to organizations and industry verticals) by a user, by establishing at least a temporary communication link between the computing device 102 and the device 136 implementing the interface 134, so that the user can upload or otherwise make the data 132 available to the computing device 102. Upon accessing the data 132 provided (3.5.1) Integer programming method. As with "probability reduction," we can address "cost reduction" by finding a solution to a set of integer constraints. We will use the same notation as in 3.4.2. However, there is one key difference, we only consider organizations in set U where susceptible_vuln(o,v)>0.0.

$$\text{Min } \Sigma_o(1-Y_o) \times \text{cost\_vuln}(o,v)$$

Subject to: $\Sigma_o Y_o \leq K$

Each o such that the corresponding $Y_o$ variable is 1 can be considered part of the solution if the result of the objective function has a value less than X. If the value of the objective function is greater than X, then K must be increased, as this would indicate there is no set of K organizations that can reduce the cost to the desired level.

(3.5.2) Other methods. Various combinatorial methods can be used as alternatives to the above-described integer programming approach—for instance, methods used for subset-sum and related combinatorial problems.

Referring to FIG. 5, a screenshot 400 illustrating one exemplary embodiment of the interface 134 is shown that may be implemented with any one or more of the embodiments (150, 200, and 300) of the system 100 described herein, and may be leveraged for, e.g., uploading and identifying sources of aggregation risk. Embodiments of the interface 134 described in this section is based on software vulnerabilities. However, the interface 400 can also apply to software, hardware, or combinations thereof. As previously described, the interface 134 may be presented by way of a portal or gateway embodied as an API, a browser-based application, a mobile application, or the like. In other words, the interface 134 can be web-based, but instantiations as stand-alone software are also possible. In general, the interface 134 accommodates input of data 132 defining aspects of some external IT system 130 associated with an organization, or other external data (which may be specific to organizations and industry verticals) by a user, by establishing at least a temporary communication link between the computing device 102 and the device 136 implementing the interface 134, so that the user can upload or otherwise make the data 132 available to the computing device 102. Upon accessing the data 132 provided through the interface 134, the computing device 102 can perform one or more computations from the data 132 and return some cyber risk output for one or more of an organization, industry vertical, etc. associated with the IT system 130, in the form of a probability of attack for an organization, or some other output or metric as described herein.

In some embodiments, using the interface 134, as illustrated by the screenshot 400, a user may upload a file 402 or other data structure for access by the computing device 102. In some embodiments, the file 402 is an implementation of the data 132 specific to an IT system 130 associated with some organization. Embodiments of the system 100 may allow for a user to upload of multiple CSV files or similar spreadsheets using the drag-drop window 404, and then submit files using a submit button 406. This capability can also be instantiated in other ways such as supplying (from the device 136 to the computing device 102) a URL or link to a repository, folder, database, or similar storage facility.

In particular for example, in some embodiments, each file 402 may represent the previous results of a vulnerability scan from a different organization. As elaborated upon in more detail in FIG. 6, a vulnerability scan is generally a scan of the data 132 by the computing device 102 or otherwise to map a CPE identifier from the data 132 to a common vulnerability enumeration (CVE) identifier. A given mapping of a CPE identifier to a CVE identifier during the vulnerability scan highlights a possible vulnerability to the target IT system 130.

The computing device 102 may aggregate any information of the vulnerability scan and present the results in the form of a reporting window or tab 408 of the interface 134 as shown. For large quantities of organizations, this may require the use of software to easily enable parallelization Aggregated results of one or more vulnerability scans, and processing applied to vulnerability scans applied to multiple IT systems according to the functionality of the system 100 described herein may be organized and presented via the interface 134 in any number of formats. In some embodiments, the overall result may comprise a single spreadsheet (or series of database entries) bearing columns resembling the following:

Vulnerability ID (i.e. by CVE number)
Description of vulnerability
Probability of exploitation
Number of affected organizations
Total number of affected computer systems (i.e. the sum of affected systems across all organizations0
Median number of affected computer systems
Expected number of infected systems (arising from the probability of exploitation multiplied by the total number of affected systems)
Median expected number of infected systems
Source data (i.e. text from actual hacker community discussions used to derive the probability)

In some embodiments, the reporting window 408 of the interface 134 may define Summary Statistics, to include number of organizations, number of vulnerabilities affecting more than one organization, and the range of probability of exploitation of the $90^{th}$ percentile of vulnerabilities occurring in the population.

It should be appreciated that the embodiments (150, 200, and 300) of the system 100 are not mutually exclusive, such that the system 100 may be configured to include any number of features from one or more of these embodiments. More specifically, the expressions and variations to the general mathematical expressions of each embodiment are related and are not mutually exclusive to one embodiment or another.

Figure 6:
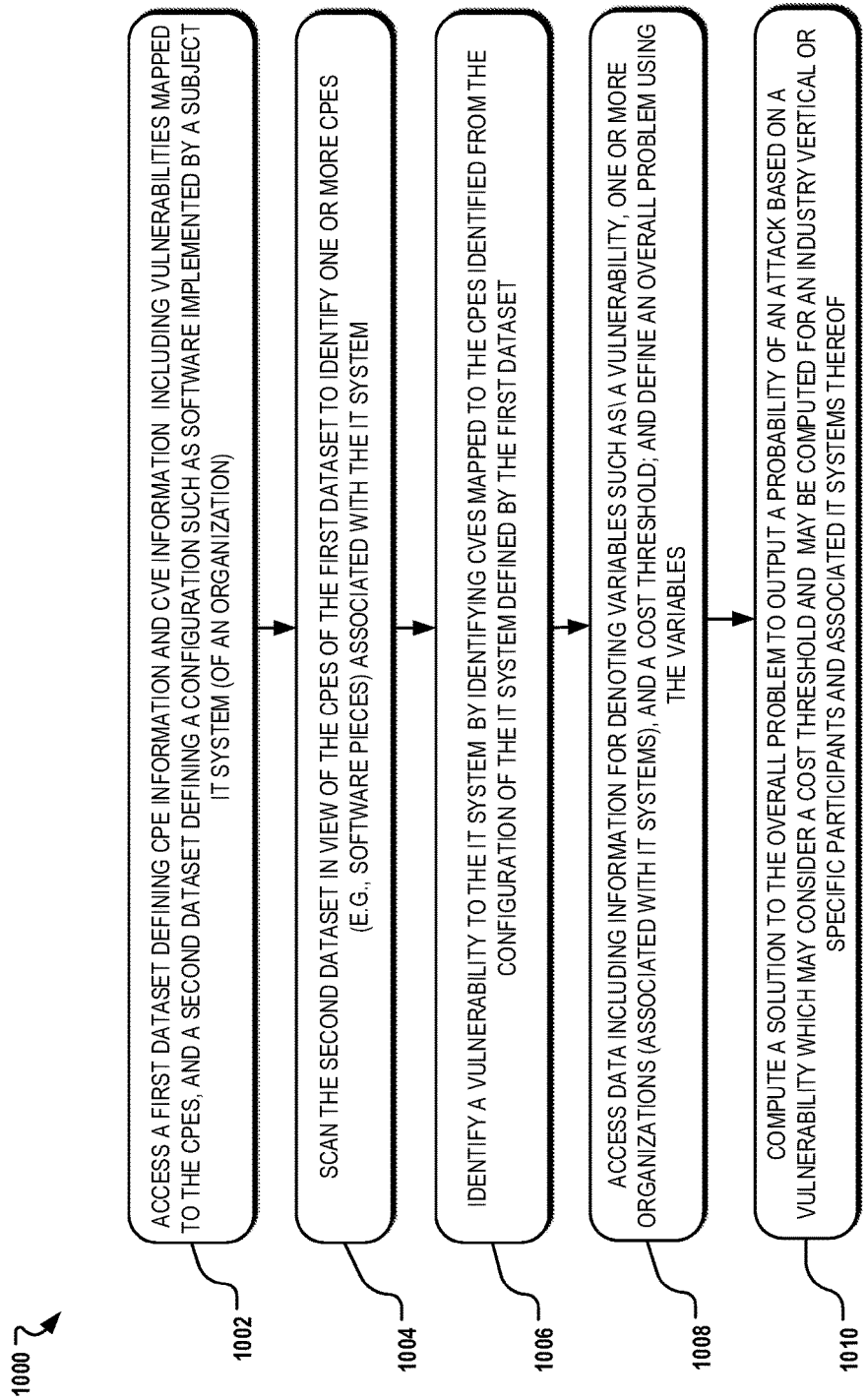
FIG. 6 is a simplified block diagram of a general computer-implemented method of applying aspects of the system of FIG. 1 for aggregating, and computing probabilities of risk of a cyber-related attack in view of predetermined costs.

Referring now to a process flow diagram 1000 of FIG. 6, one possible implementation of various embodiments of the system 100 shall now be described. Referring to block 1002, a first dataset, or any number datasets of the data 112 may be accessed, collected, or acquired by the computing device 102 as illustrated in FIG. 1. The first dataset of the data 112 may include information from, by non-limiting examples, dark web forums, blogs, marketplaces, intelligence threat APIs, data leaks, data dumps, the general Internet or World Wide Web (126), and the like, and may be acquired using web crawling, RESTful HTTP requests, HTML parsing, or any number or combination of such methods. The data 112 may further include information originating from the NVD including CPEs, corresponding CVEs, and CVSS scores. In addition, a second dataset may be accessed by the computing device 102 from data 132 associated with the IT system 130. The data 132, as previously described, may include information about a configuration of the IT system 130 including software, hardware, and/or combinations thereof implemented by the IT system 130; the IT system 130 being associated with an organization related to some industry vertical. In some embodiments, a user may provide the second dataset or otherwise make the second dataset available to the computing device 102 by implementing the interface 134 (detailed in FIG. 5) via the client device 136.

In one specific embodiment, using the API 119, the first dataset may be acquired from a remote database hosted by, e.g., host server 120. In this embodiment, the host server 120 gathers D2web data from any number of D2web sites or platforms and makes the data accessible to other devices. More particularly, the computing device 102 issues an API call to the host server 120 using the API 119 to establish a RESTful Hypertext Transfer Protocol Secure (HTTPS) connection. Then, the data 112 can be transmitted to the computing device 102 in an HTTP response with content provided in key-value pairs (e.g., JSON).

Once accessed, the first dataset and/or the second dataset may be preprocessed by, e.g., cleaning, formatting, sorting, or filtering the information, or modeling the information in some predetermined fashion so that, e.g., the data 112 is compatible or commonly formatted between the datasets. For example, in some embodiments, the first dataset or the second dataset may be processed by applying text translation, topic modeling, content tagging, social network analysis, or any number or combination of artificial intelligence methods such as machine learning applications. Any of such data cleaning techniques can be used to filter content of the first dataset from other content commonly discussed in the D2web such as drug-related discussions or pornography.

Referring to blocks 1004 and 1006, utilizing any number of artificial intelligence methods such as natural language processing, the processor 104 scans the data 112 to identify components of the second dataset associated with CPE identifiers corresponding to CPEs of the first dataset. More specifically, by non-limiting example, the processor 102 conducts a character or keyword search of the second dataset defining the components/inventory of the IT system 130 in view of CPE identifiers and corresponding CPEs from the first dataset. In this manner, the processor 102 identifies possible components of the IT system 130 that are affiliated with at least one CPE (and possible CVE).

In addition, the processor 102 maps (or leverages predefined mappings between CPEs and CVEs) least one of the components of the IT system 130 to a CVE based on an identified CPE associated with the IT system 130. This step identifies at least one vulnerability to the IT system 130. For example, an exemplary technology configuration of the IT system 130 may define a computing environment running Windows Server 2008 on an IBM computing device, and it may be discovered via intelligence from the first dataset that such an exemplary technology configuration is susceptible or vulnerable to an Attack Vector V (which may include, for example, malware, exploits, the known use of common system misconfigurations, or other attack methodology), based on e.g., historical cyber-attacks. In either case, this functionality outputs at least one CVE/attack vector that poses at least some threat to the IT system 130.

Referring to block 1008, the processor 104 may further execute functionality based on any of the embodiments of the system 100 described herein to generate an overall problem or mathematical model, and variants thereof as desired for different applications. As indicated herein, the overall problem may generally define variables such as a population of organizations, a single organization or select organizations of an industry vertical, a vulnerability, a payout threshold or cost, and the like. The overall problem may, using the variables, define an expression for calculating a probability of an attack costing a certain amount in terms of damage, and may consider vulnerabilities of a specific or single IT system and/or a vulnerability known generally to be problematic to an industry vertical comprising a plurality of IT systems (e.g., where it is desired to weigh the risk to an organization but it is further desired to keep the specifics of the technology configuration associated with the organization confidential—such that the overall problem is modeled to assess the probability of an attack to any IT system associated with an industry vertical where IT systems associate with the industry vertical generally implement at least generic versions of the same or similar technology).

Referring to block 1010, the processor 104 computes a solution to the overall problem to at least calculate a probability of an attack. As indicated in the descriptions of the embodiment 150 and the embodiment 200 of the system 100, computations executed by the processor 104 to solve the overall problem may include exponential-time algorithms, a dynamic programming algorithm, sampling, application of a subset problem, and the like. As further described, algorithms applied and processed/computed to solve the problem may include variations; e.g., sampling may be biased, cost may be set to "1," and the like. A related model may further be defined and solved to identify organizations to be incentivized to reduce aggregation risk, as set forth in the description of the embodiment 300.

Figure 7:
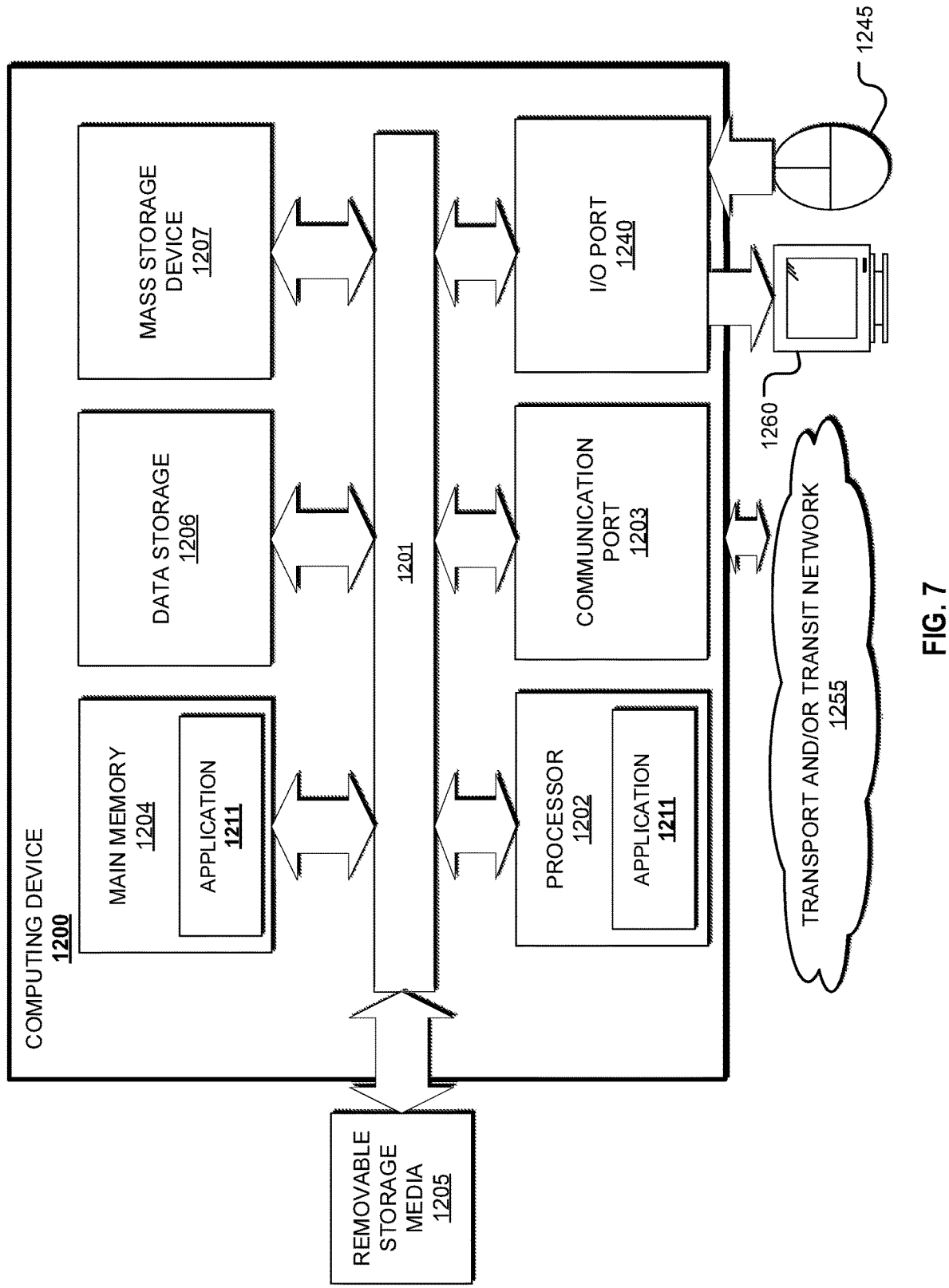
FIG. 7 is an example simplified schematic diagram of a computing device that may implement various methodologies described herein.

Computations for defining and solving the expressions herein and processing related algorithms may
Exemplary Computing Device Referring to FIG. 7, a computing device 1200 is illustrated which may take the place of the computing device 102 be configured, via one or more of an application 1211 or computer-executable instructions, to execute functionality described herein. More particularly, in some embodiments, aspects of the predictive methods herein may be translated to software or machine-level code, which may be installed to and/or executed by the computing device 1200 such that the computing device 1200 is configured to execute functionality described herein. It is contemplated that the computing device 1200 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 1200 may include various hardware components, such as a processor 1202, a main memory 1204 (e.g., a system memory), and a system bus 1201 that couples various components of the computing device 1200 to the processor 1202. The system bus 1201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 1200 may further include a variety of memory devices and computer-readable media 1207 that includes removable/non-removable media and volatile/nonvolatile media and/or tangible media, but excludes transitory propagated signals. Computer-readable media 1207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 1200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 1204 includes computer storage media in the form of volatile/nonvolatile memory such as read only memory (ROM) and random access memory (RAM). A basic input/output system (BIOS), containing the basic routines that help to transfer information between elements within the computing device 1200 (e.g., during start-up) is typically stored in ROM. RAM typically contains data and/or program modules that are immediately accessible to and/or presently being operated on by processor 1202. Further, data storage 1206 in the form of Read-Only Memory (ROM) or otherwise may store an operating system, application programs, and other program modules and program data.

The data storage 1206 may also include other removable/non-removable, volatile/nonvolatile computer storage media. For example, the data storage 1206 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 1200.

A user may enter commands and information through a user interface 1240 (displayed via a monitor 1260) by engaging input devices 1245 such as a tablet, electronic digitizer, a microphone, keyboard, and/or pointing device, commonly referred to as mouse, trackball or touch pad. Other input devices 1245 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 1245 are in operative connection to the processor 1202 and may be coupled to the system bus 1201, but may be connected by other interface and bus structures, such as a parallel port, game port or a universal serial bus (USB). The monitor 1260 or other type of display device may also be connected to the system bus 1201. The monitor 1260 may also be integrated with a touch-screen panel or the like.

The computing device 1200 may be implemented in a networked or cloud-computing environment using logical connections of a network interface 1203 to one or more remote devices, such as a remote computer. The remote computer may be a personal computer, a server, a router, a network PC, a peer device or other common network node, and typically includes many or all of the elements described above relative to the computing device 1200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 1200 may be connected to a public and/or private network through the network interface 1203. In such embodiments, a modem or other means for establishing communications over the network is connected to the system bus 1201 via the network interface 1203 or other appropriate mechanism. A wireless networking component including an interface and antenna may be coupled through a suitable device such as an access point or peer computer to a network. In a networked environment, program modules depicted relative to the computing device 1200, or portions thereof, may be stored in the remote memory storage device.

The computing device 1200 is just one example of a physical device that may be implemented to perform the computations for defining and solving the expressions and processing related algorithms set forth herein. Many variations and related computing approaches are contemplated. For example, multiple processors may be clustered and balanced to reduce computational overhead to one machine and leverage the computational resources of a cluster. Cluster parallel machines and hybrid cluster parallel machines may be implemented. Scalable multithreaded shared memory supercomputer architectures may further be leveraged such as CRAY MTA to parallelize algorithms described herein. Quantum or photonic computing devices may further be leveraged to enhance processing of the functionality described herein.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise. a general-purpose processor configured using software, the general-purpose processor may be configured as respective different hardware-implemented modules at different times. Software may accordingly configure the processor 1202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Computing systems or devices referenced herein may include desktop computers, laptops, tablets e-readers, personal digital assistants, smartphones, gaming devices, servers, and the like. The computing devices may access computer-readable media that include computer-readable storage media and data transmission media. In some embodiments, the computer-readable storage media are tangible storage devices that do not include a transitory propagating signal. Examples include memory such as primary memory, cache memory, and secondary memory (e.g., DVD) and other storage devices. The computer-readable storage media may have instructions recorded on them or may be encoded with computer-executable instructions or logic that implements aspects of the functionality described herein. The data transmission media may be used for transmitting data via transitory, propagating signals or carrier waves (e.g., electromagnetism) via a wired or wireless connection.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
a processor;
a network interface in operable communication with the processor, the network interface operable for communicating with a network and providing the processor with access to information including common platform enumerations (CPEs) and corresponding common vulnerability enumerations (CVEs); and
a memory storing a set of instructions executable by the processor, the set of instructions, when executed by the processor, operable to:
access a dataset, wherein the dataset comprises a plurality of vulnerabilities, a plurality of software components, and a plurality of organizations, wherein each of the plurality of organizations is associated with at least one of the plurality of vulnerabilities or at least one of the plurality of software components,
determine a set of risk probabilities using artificial intelligence for one of the plurality of software components or one of the plurality of vulnerabilities, wherein the set of risk probabilities comprises:
a first probability value associated with a probability that the software component or vulnerability will be exploited across the plurality of organizations, and
a second probability value associated with a probability that the software component or vulnerability in association with each of the plurality of organizations will be exploited,
evaluate a cost figure for the vulnerability or the software component based on the set of risk probabilities associated with the vulnerability or the software component and each of the plurality of organizations,
determine an overall probability that a software component or vulnerability will be exploited and have an associated payout of at least a given amount as a result of having been exploited across the plurality of organizations; and
after determining the overall probability, the processor is further operable to identify a first group of one or more organizations of the plurality of organizations such that one or more risk probabilities of the set of risk probabilities will be reduced if the corresponding vulnerability or software component is resolved.

2. The system of claim 1, further comprising:
a graphical user interface in operable communication with the processor, the graphical user interface configured for uploading and identifying sources of aggregation risk.

3. The system of claim 1, wherein by executing the set of instructions, the processor is further operable to:
identify a second group of one or more organizations of the plurality of organizations such that a risk probability of an incident having a cost greater than or equal to a threshold cost has a significantly reduced probability if the corresponding vulnerability or software component is resolved.

4. The system of claim 2, wherein the information pertaining to the vulnerability or the software component displayed in the graphical user interface comprises an expected number of infected systems arising from a probability of exploitation of the vulnerability multiplied by a total number of affected systems.

5. The system of claim 1, wherein the first probability value is determined using one or more of the following:
availability of exploit for the software component or vulnerability;
knowledge of the vulnerability or a vulnerability associated with the software component; and
historical exploitation rate for one or more attributes related to the software component or vulnerability.

6. The system of claim 5, wherein the knowledge of the vulnerability or the vulnerability associated with the software component is collected from one or more vulnerability databases.

7. The system of claim 5, wherein the knowledge of the vulnerability or the vulnerability associated with the software component is collected from one or more surface web or deep web resources.

8. The system of claim 5, wherein the one or more attributes include related software, developers, vendors, and/or hacker interest.

9. The system of claim 1, wherein the second probability value is determined using one or more of the following:
strength of security attributes associated with each of the plurality of organizations;
historical exploitation rate of the software component or vulnerability for each of the plurality of organizations; and
historical effectiveness record for each of the plurality of organizations in preventing exploitation of the software component or vulnerability.

10. The system of claim 1, wherein the overall probability that a software component or vulnerability will be exploited and have an associated payout of at least a given amount as a result of having been exploited is determined by mapping to a subset sum problem with inputs comprised of a set of numbers, the subset sum problem further defining a target amount and an output being all subsets of the set of numbers that sum to the target amount or greater.

11. The system of claim 10, wherein in the mapping to the subset sum problem the target amount defines a payout lower bound.

12. The system of claim 2, wherein the graphical user interface accommodates input of a spreadsheet or comma-separated variable file for use by the processor.

* * * * *